US012605230B2

(12) United States Patent
Son et al.

(10) Patent No.: US 12,605,230 B2
(45) Date of Patent: Apr. 21, 2026

(54) METHOD AND TERMINAL DEVICE FOR MANAGING TEETH USING ORAL IMAGE

(71) Applicant: SMARTOOTH CO., LTD., Seoul (KR)

(72) Inventors: Ho Jung Son, Seoul (KR); Myung Seon Ryou, Seoul (KR); Yoon A Kim, Gunpo-si (KR); Chong Lee, Seoul (KR); Won Hyung Ryou, Seoul (KR)

(73) Assignee: SMARTOOTH CO., LTD., Seoul (KR)

( * ) Notice: Subject to any disclaimer, the term of this patent is extended or adjusted under 35 U.S.C. 154(b) by 768 days.

(21) Appl. No.: 17/991,306

(22) Filed: Nov. 21, 2022

(65) Prior Publication Data

US 2023/0338117 A1 Oct. 26, 2023

(30) Foreign Application Priority Data

Apr. 26, 2022 (KR) ........................ 10-2022-0051183

(51) Int. Cl.
*A61B 5/00* (2006.01)
*A61C 7/00* (2006.01)

(52) U.S. Cl.
CPC ................................... *A61C 7/002* (2013.01)

(58) Field of Classification Search
CPC ..... A61C 7/002; A61B 5/0022; A61B 5/4547; A61B 5/0088; G16H 30/40; G16H 50/20; G16H 15/00; G16H 10/65
See application file for complete search history.

(56) References Cited

U.S. PATENT DOCUMENTS

| | | | |
|---|---|---|---|
| 2002/0178032 A1* | 11/2002 | Benn ...................... | G16H 10/60 705/2 |
| 2021/0244502 A1* | 8/2021 | Farkash ............... | A61B 5/0077 |
| 2023/0274431 A1* | 8/2023 | Uno .......................... | G06T 7/75 382/128 |

FOREIGN PATENT DOCUMENTS

| | | |
|---|---|---|
| KR | 10-2016-0103468 A | 9/2016 |
| KR | 10-2019-0129247 A | 11/2019 |
| KR | 10-2267739 B1 | 6/2021 |

* cited by examiner

*Primary Examiner* — Kent Yip
(74) *Attorney, Agent, or Firm* — United One Law Group LLC; Kongsik Kim; Jhongwoo Peck

(57) ABSTRACT

A method of managing teeth performed in a processor-based device includes: displaying a first oral measurement image including tooth measurement images in a tooth shape to measure state information of each of user's teeth; receiving state information of a target teeth of the user measured from a tooth diagnostic device; receiving a selection signal input for selecting a first tooth measurement image from among the tooth measurement images; matching state information of the target tooth with state information of the first tooth measurement image; and representing the state information of the first tooth measurement image in the first oral measurement image.

17 Claims, 21 Drawing Sheets

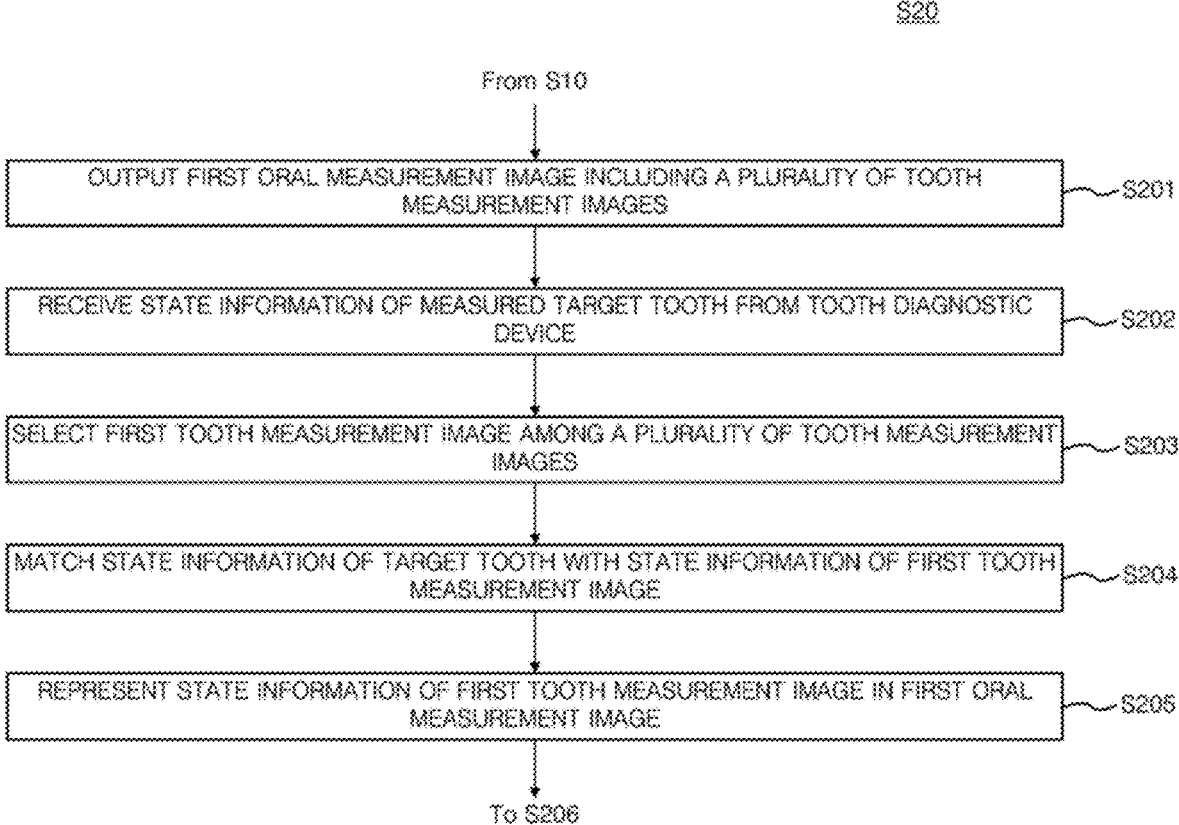

S20

From S10

| OUTPUT FIRST ORAL MEASUREMENT IMAGE INCLUDING A PLURALITY OF TOOTH MEASUREMENT IMAGES | S201 |

| RECEIVE STATE INFORMATION OF MEASURED TARGET TOOTH FROM TOOTH DIAGNOSTIC DEVICE | S202 |

| SELECT FIRST TOOTH MEASUREMENT IMAGE AMONG A PLURALITY OF TOOTH MEASUREMENT IMAGES | S203 |

| MATCH STATE INFORMATION OF TARGET TOOTH WITH STATE INFORMATION OF FIRST TOOTH MEASUREMENT IMAGE | S204 |

| REPRESENT STATE INFORMATION OF FIRST TOOTH MEASUREMENT IMAGE IN FIRST ORAL MEASUREMENT IMAGE | S205 |

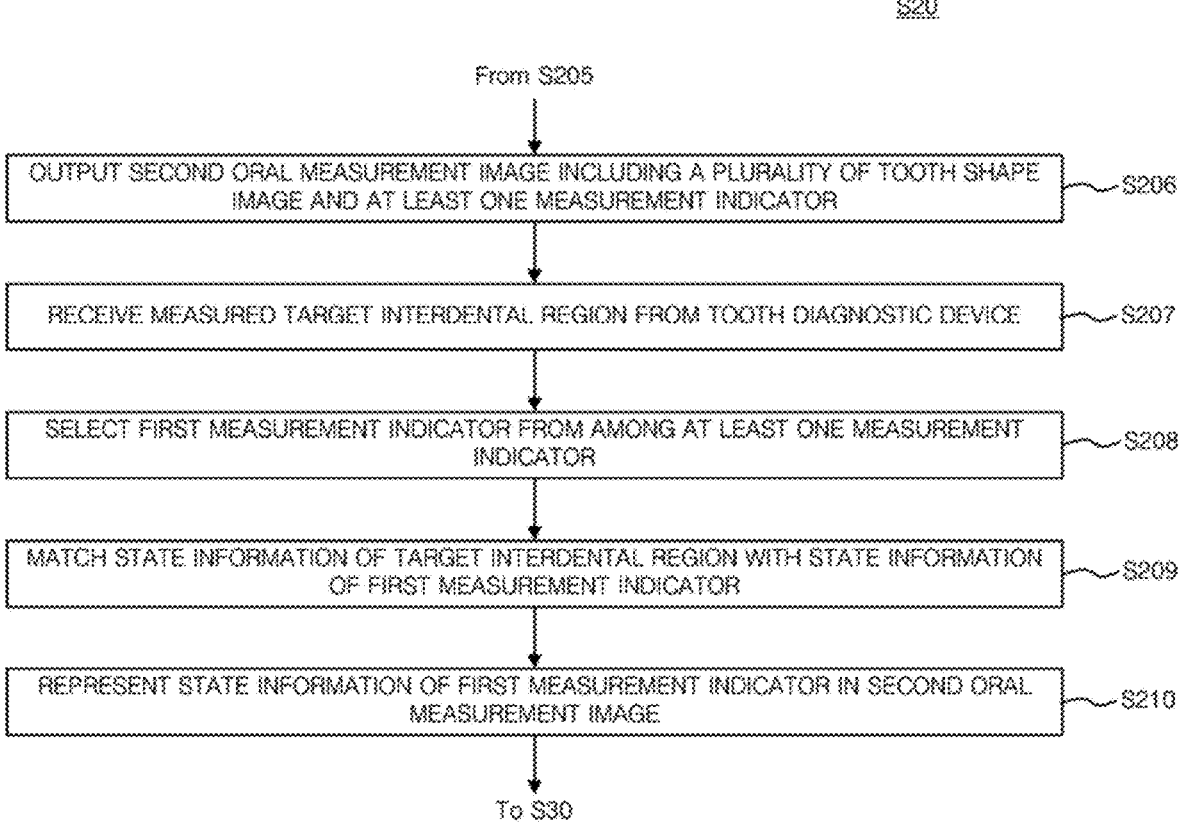

S20

From S205

OUTPUT SECOND ORAL MEASUREMENT IMAGE INCLUDING A PLURALITY OF TOOTH SHAPE IMAGE AND AT LEAST ONE MEASUREMENT INDICATOR — S206

RECEIVE MEASURED TARGET INTERDENTAL REGION FROM TOOTH DIAGNOSTIC DEVICE — S207

SELECT FIRST MEASUREMENT INDICATOR FROM AMONG AT LEAST ONE MEASUREMENT INDICATOR — S208

MATCH STATE INFORMATION OF TARGET INTERDENTAL REGION WITH STATE INFORMATION OF FIRST MEASUREMENT INDICATOR — S209

REPRESENT STATE INFORMATION OF FIRST MEASUREMENT INDICATOR IN SECOND ORAL MEASUREMENT IMAGE — S210

To S30

METHOD AND TERMINAL DEVICE FOR MANAGING TEETH USING ORAL IMAGE

CROSS-REFERENCE TO RELATED APPLICATION

This application claims priority to Korean Patent Application No. 10-2022-0051183, filed on Apr. 26, 2022, which is incorporated herein by reference in its entirety.

BACKGROUND

1. Technical Field

Embodiments of the present invention relate to a method of managing teeth for easily measuring state information of user's teeth and/or interdental region by using an oral image and providing the measured state information to a user so that the user may easily view the measured state information, and a terminal device for performing the same.

2. Related Art

When a user does not properly brush or does not use floss after eating food, food residues remain on teeth, which may lead to the proliferation of bacteria, and thus, infectious diseases such as decayed teeth.

In order to prevent the above-described oral diseases and keep teeth healthy, it is important to periodically measure a user's tooth state to observe the tooth state. Accordingly, there is a need for a technology that provides a service for simply and easily checking a tooth state to a user.

SUMMARY

The object of the present invention is to provide a method of managing teeth capable of simply and easily providing a tooth state to a user based on user's teeth-related state information measured by a tooth diagnostic device, and a terminal device for performing the same.

The objects of the present invention are not limited to the above-described object, and other aspects and advantages of the present invention that are not mentioned may be understood by the following description and will be more clearly understood by embodiments of the present invention. In addition, it may be easily appreciated that the objects and advantages of the present invention may be realized by means mentioned in the claims and a combination thereof.

According to an aspect of the present invention, a method of managing teeth performed in a processor-based device includes: displaying a first oral measurement image including tooth measurement images in a tooth shape to measure state information of each of user's teeth; receiving state information of a target teeth of the user measured from a tooth diagnostic device; receiving a selection signal input for selecting a first tooth measurement image from among the tooth measurement images; matching state information of the target tooth with state information of the first tooth measurement image; and representing the state information of the first tooth measurement image in the first oral measurement image.

According to another aspect of the present invention, a terminal device includes: a display unit configured to display a first oral measurement image including tooth measurement images in a tooth shape to measure state information of each of user's teeth; a communication unit configured to receive state information of a target teeth of the user measured from a tooth diagnostic device; a user interface unit configured to receive a selection signal input for selecting a first tooth measurement image from among the tooth measurement images; and a controller configured to control to match the state information of the target tooth with state information of the first tooth measurement image, and represent the state information of the first tooth measurement image to be represented in the first oral measurement image.

BRIEF DESCRIPTION OF THE DRAWINGS

FIGS. 4 to 6 are diagrams illustrating a flowchart of a method of managing teeth according to an embodiment of the present invention.

DETAILED DESCRIPTION

Figure 1:
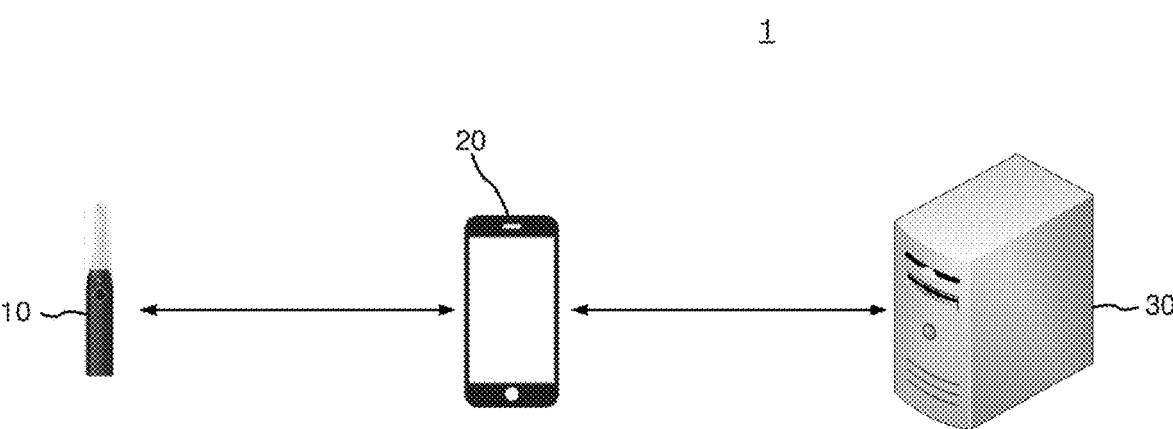
FIG. 1 is a diagram illustrating a schematic configuration of a system for managing teeth according to an embodiment of the present invention.

The present invention may be variously modified and have several embodiments, and thus, specific embodiments will be illustrated in the accompanying drawings and be described in detail. However, it is to be understood that the present invention is not limited to a specific exemplary embodiment, but includes all modifications, equivalents, and substitutions contained in the scope and spirit of the present invention. In describing each drawing, similar reference numerals are used for similar components.

The terms such as "first," "second," or the like, may be used to describe various components, but these components are not to be construed as being limited to these terms. The terms are used only in order to distinguish one component from another component. The term "and/or" includes a combination of a plurality of items described as related or any one of the plurality of items described as related.

The terms used in the present specification are used only to describe specific embodiments rather than limiting the present invention. Singular forms are intended to include plural forms unless the context clearly indicates otherwise. It is to be understood that the term "include" or "have" used herein specifies the presence of features, numbers, steps, operations, components, parts, or combinations thereof described in the present specification, or combinations thereof, but does not preclude the presence or addition of one or more other features, numbers, steps, operations, components, parts, or combinations thereof.

Hereinafter, embodiments of the present invention will be described in detail with reference to the accompanying drawings.

FIG. 1 is a diagram illustrating a schematic configuration of a system 1 for managing teeth according to an embodiment of the present invention.

Referring to FIG. 1, the system 1 for managing teeth according to an embodiment of the present invention may include a tooth diagnostic device 10, a user terminal 20, and a tooth management server 30.

The tooth diagnostic device 10 may be a device for measuring a state of a user's teeth and/or an interdental region. For example, the tooth diagnostic device 10 may be a portable device that measures a state of user's teeth and/or interdental region using an optical sensor. However, the present invention is not limited thereto, and the present invention may be applied to any type of tooth diagnostic device 10. For example, the tooth diagnostic device 10 includes a tooth diagnostic device of an acidity (pH) measurement method, a camera-based tooth diagnostic device, and the tooth diagnostic device 10 interlocked with X-rays.

Figure 2:
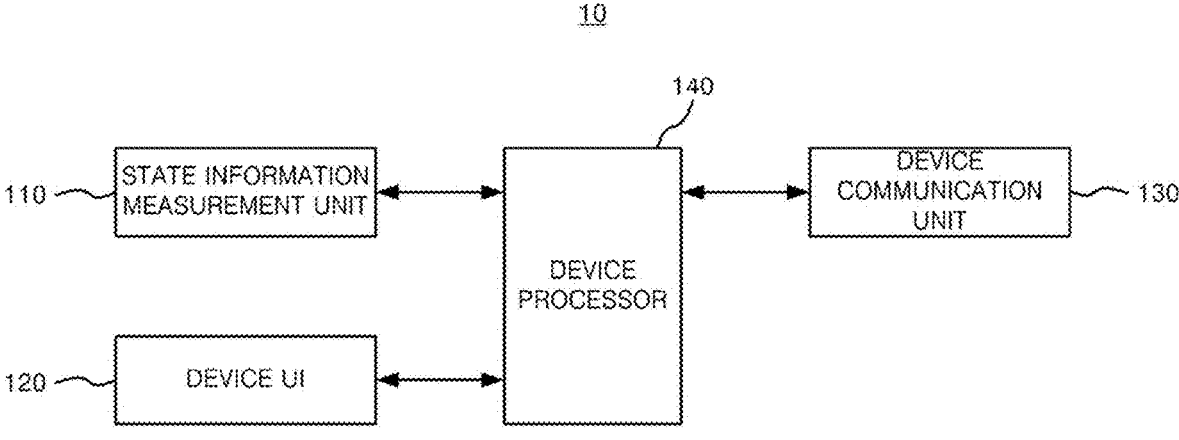
FIG. 2 is a block diagram illustrating a schematic configuration of a tooth diagnostic device according to an embodiment of the present invention.

FIG. 2 is a block diagram illustrating a schematic configuration of the tooth diagnostic device 10 according to an embodiment of the present invention.

Referring to FIG. 2, the tooth diagnostic device 10 may include a state information measurement unit 110, a user interface unit 120, a device communication unit 130, and a device processor 140.

The state information measurement unit 110 may include an optical sensor that measures the state of the user's teeth and/or the interdental region based on transmission/reception of light (e.g., laser). Alternatively, the state information measurement unit 110 may correspond to a probe including a pH sensor for measuring the acidity (pH) of the user's teeth and/or the interdental region.

Hereinafter, for convenience of description, the "state information of the tooth and/or the interdental region" will be referred to as "teeth-related state information."

The device user interface (UI) 120 may receive an input signal from a user, and may display various information related to the state information measurement unit 110.

The device communication unit 130 may be a communication module that communicates with an external electronic device. In particular, the device communication unit 130 may transmit the teeth-related state information to the user terminal 20. To this end, the device communication unit 130 may include a short-range communication module. In particular, the device communication unit 130 may include a Bluetooth module.

The device processor 140 may include one or more of a central processing unit including an internal memory, an application processor, or a communication processor. The device processor 140 may execute an operation or data processing related to control and/or communication of at least one other component of the tooth diagnostic device 10. In particular, the device processor 140 may generate the state information of the tooth and/or the interdental region measured by the state information measurement unit 110.

The teeth-related state information may correspond to a state numerical value (or a caries progression value). For example, the state numerical value may have any one numerical value of 0 to 99 points. The higher the state numerical value, the more cavities of the teeth and/or the interdental region may progress, and the lower the state numerical value, the healthier the teeth and/or the interdental region.

According to an embodiment, the teeth-related state information may be represented in a plurality of stages. The plurality of stages may include a first stage, a second stage, and a third stage.

The first stage may be a caries good stage. The caries good stage may be a stage in which teeth are hardly damaged. For example, a section of the state numerical value corresponding to the first stage may be 0 to 19 points.

The second stage may be a caries attention stage. The caries attention stage may be a stage in which enamel of teeth is damaged. For example, a section of the state numerical value corresponding to the second stage may be 20 to 39 points.

The third stage may be a caries risk stage. The caries risk stage may be a stage in which the enamel and dentin of teeth are damaged. For example, a section of the state numerical value corresponding to the third stage may be 40 to 99 points.

Referring to the above, the tooth diagnostic device 10 may calculate teeth-related state information (state numerical value) based on information measured by an optical sensor or a pH sensor, and transmit the calculated teeth-related state information of the user to the terminal 20. However, the present invention is not limited thereto. According to another embodiment, the tooth diagnostic device 10 may transmit the information measured by the optical sensor or the pH sensor to the user terminal 20, and the user terminal 20 may calculate the teeth-related state information (state numerical value) based on the information measured by the optical sensor or the pH sensor.

Referring back to FIG. 1, the user terminal 20 may be a terminal owned by a user. For example, the user terminal 20 may be a smart device such as a smart phone, a smart pad, a smart location, or a smart TV.

The user terminal 20 may receive the user's teeth-related state information measured by the tooth diagnostic device 10, and may generate user's oral result state information based on the received teeth-related state information. The oral result state information may be visually output to a user.

Figure 3:
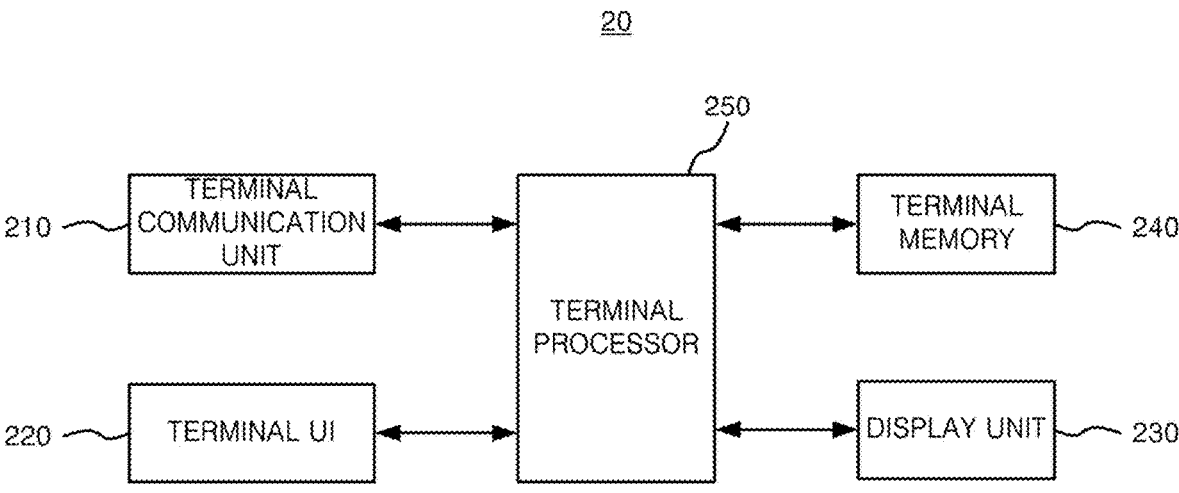
FIG. 3 is a block diagram illustrating a schematic configuration of a user terminal according to an embodiment of the present invention.

FIG. 3 is a block diagram illustrating a schematic configuration of the user terminal 20 according to the embodiment of the present invention.

Referring to FIG. 3, the user terminal 20 may include a terminal communication unit (or communicator) 210, a terminal UI 220, a display unit (display device) 230, a terminal memory 240, and a terminal processor 250.

The terminal communication unit 210 may be a communication module for performing communication with the tooth diagnostic device 10 and the tooth management server 30. To this end, the terminal communication unit 210 may include a first terminal communication module and a second terminal communication module.

The first terminal communication module may communicate with the tooth diagnostic device 10. As an example, the first terminal communication module may be a short-range communication module, in particular, a Bluetooth module.

The second terminal communication module may communicate with the tooth management server 30. For example, the second terminal communication module may be a short-range communication module (e.g., a WiFi module) and/or a long-distance communication module.

The terminal UI 220 may receive an input signal from a user. The input signal may include a "selection signal of a tooth image" to be described later, and the selection signal may include a text signal, a voice signal, and a touch event signal.

The display unit 230 may be a device capable of displaying an image or an image frame to a user. The display unit 230 may output an execution screen of an application executed by the terminal processor 250 to be described later, and in particular, may visually display various tooth images.

Meanwhile, the terminal UI 220 and the display unit 230 may be implemented as one device. That is, the display unit 230 may be a touch display that receives a user's touch signal, and in this case, the terminal UI 220 may be omitted from the user terminal 20.

The terminal memory 240 may be a volatile and/or non-volatile memory, and may store instructions or data related to at least one other component of the user terminal 20. In particular, the terminal memory 240 may store instructions or data related to an application (a computer program or a recording medium) executed in the user terminal 20.

In addition, the terminal memory 240 may store information related to a user (i.e., user information) and information related to tooth management. Here, the user information may be inputted from the user and collected, and the information related to the tooth management may be collected from the outside through the terminal communication unit 210. The user information may include information on the number of teeth of a user. The information on the number of teeth of the user may include information on the number of teeth not existing in a user's oral cavity.

The terminal processor 250 may include one or more of a central processing unit, an application processor, and a communication processor. The terminal processor 250 may execute an operation or data processing related to control and/or communication of at least one other component of the user terminal 20. In particular, the terminal processor 250 may execute instructions of an application.

Referring back to FIG. 1, the tooth management server 30 may receive and store various information stored in the user terminal 20. To this end, the tooth management server 30 may include a communication unit, a memory, and a processor.

Hereinafter, a method of managing teeth will be described in detail with reference to the drawings.

Figure 4:
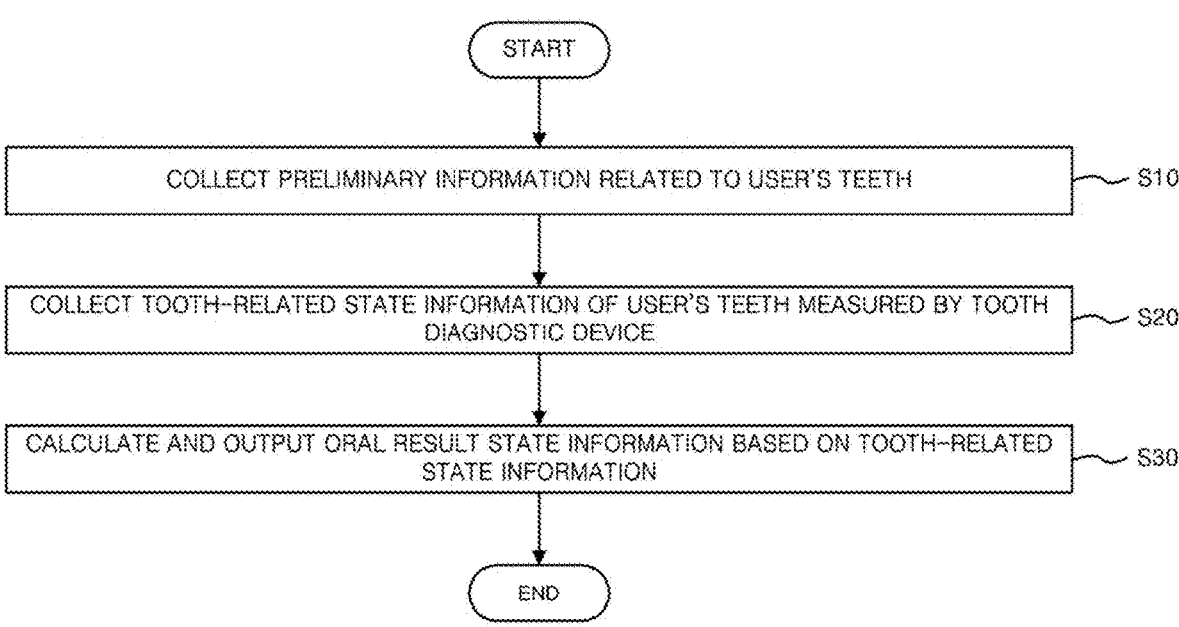

FIGS. 4 to 6 are diagrams illustrating a flowchart of a method of managing teeth according to an embodiment of the present invention.

In this case, a method of managing teeth may be performed in the user terminal 20. In addition, it is assumed that the user terminal 20 is a smart phone having a touch display unit 230. In addition, it is assumed that the application for the tooth management is executed in the user terminal 20, and the user terminal 20 has completed a communication connection (e.g., Bluetooth pairing) with the tooth diagnostic device 10.

Hereinafter, the process performed for each step will be described in detail.

First, referring to FIG. 4, in step S10, the user terminal 20 may collect preliminary information related to user's teeth. Step S10 may be performed by at least one of the terminal communication unit 210, the terminal touch display unit 230, and the terminal processor 250 of the user terminal 20.

According to an embodiment, the preliminary information may include the above-described user information and tooth management related information. The preliminary information may include information on the number of teeth of a user.

Hereinafter, a configuration for collecting information on teeth not existing in a user's oral cavity will be described in detail with reference to FIG. 7. In this case, teeth existing in the user's oral cavity will be referred to as "existing teeth" and teeth not existing in the user's oral cavity will be referred to as "non-existing teeth."

Figure 7:
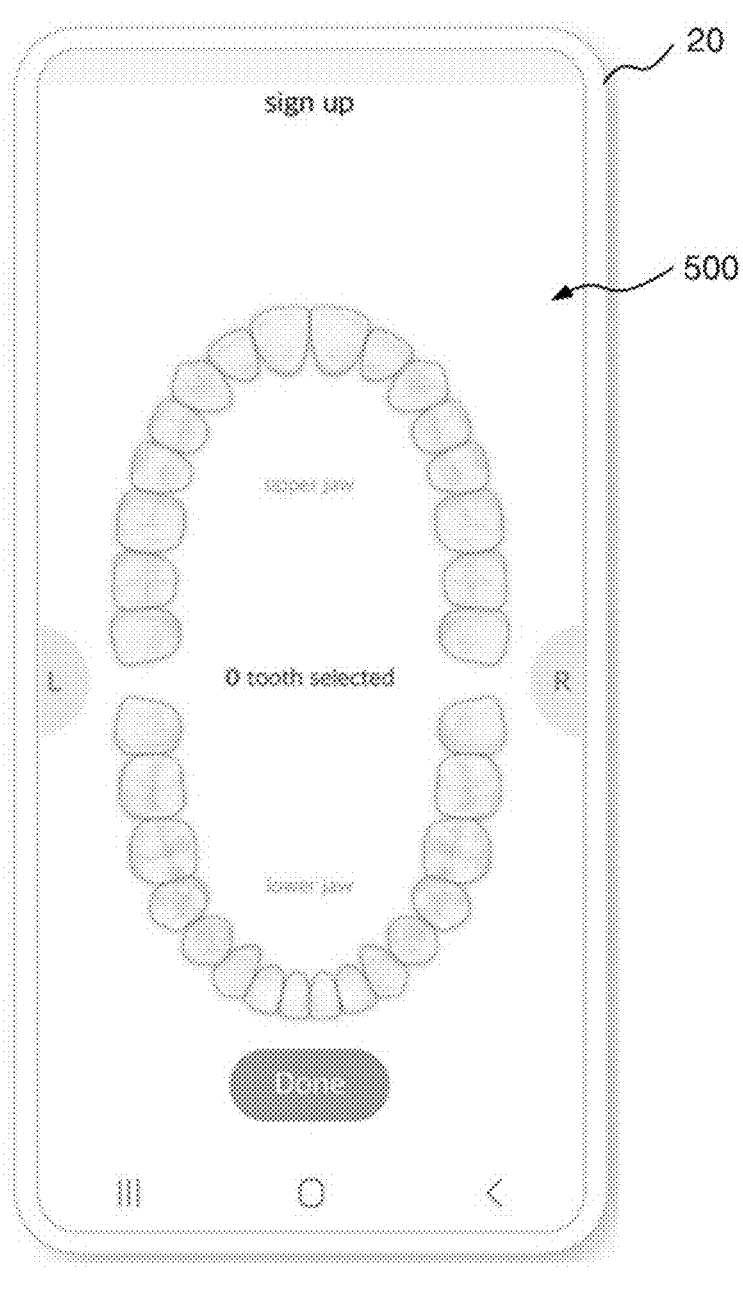
FIG. 7 is a diagram illustrating information displayed on a touch display unit of a user terminal to receive information input on teeth not existing in a user's oral cavity, according to an embodiment of the present invention.

FIG. 7 is a diagram illustrating information displayed on the touch display unit 230 of the user terminal 20 to receive information on user's non-existing teeth, according to an embodiment of the present invention.

Referring to FIG. 7, an oral image 500 for inputting teeth information may be displayed on the touch display unit 230. That is, the oral image 500 for inputting teeth information may be an oral image for receiving the information on the user's non-existing teeth.

The oral image 500 for inputting teeth information may include a plurality of tooth images 510. The plurality of tooth images 510 may be images of a tooth shape, and may be arranged and represented on the oral image 500 for inputting teeth information in a form arranged in an oral cavity.

Each of the plurality of tooth images 510 may have a unique touch area. Accordingly, when a user touches the touch area of any one of the plurality of tooth images 510, a selection signal corresponding to the touch may be input to the user terminal 20. In this way, the user terminal 20 may determine the user's non-existing teeth information.

Meanwhile, there may be one or more user's non-existing teeth. Accordingly, the user may sequentially touch the touch areas of one or more of the plurality of tooth images 510 included in the oral image 500 for inputting teeth information, and input sequential selection signals corresponding to the sequential touches to the user terminal 20. As a result, the information on one or more user's non-existing teeth may be input to the user terminal 20.

Referring back to FIG. 4, in step S20, the user terminal 20 may collect the teeth-related state information of the user's teeth measured by the tooth diagnostic device 10.

Step S20 may be performed by at least one of the terminal communication unit 210, the terminal touch display unit 230, and the terminal processor 250 of the user terminal 20.

According to an embodiment, the teeth-related state information may include the state information of the user's teeth. That is, the user terminal 20 may sequentially collect the state information of each of the user's teeth.

According to an embodiment, the teeth-related state information may include the state information of the user's teeth. That is, the teeth-related state information may sequentially collect state information of at least one interdental region of the user.

Hereinafter, a configuration for collecting the state information of the user's teeth in step S20 will be described in detail with reference to FIGS. 5 and 8 to 13, and a configuration for collecting the state information of the user's interdental region will be described in detail in step S20 with reference to FIGS. 6 and 14 to 16.

FIG. 5 is a diagram illustrating a flowchart of a detailed step for the collection of the state information of teeth in step S20 according to an embodiment of the present invention, and FIGS. 8 to 13 are diagrams illustrating a shape of a first oral measurement image 600 for collecting the state information of the user's teeth.

In step S201, the user terminal 20 may output (i.e., display) the first oral measurement image 600 including a plurality of tooth measurement images 610 represented in a tooth shape to the touch display unit 230.

Figure 8:
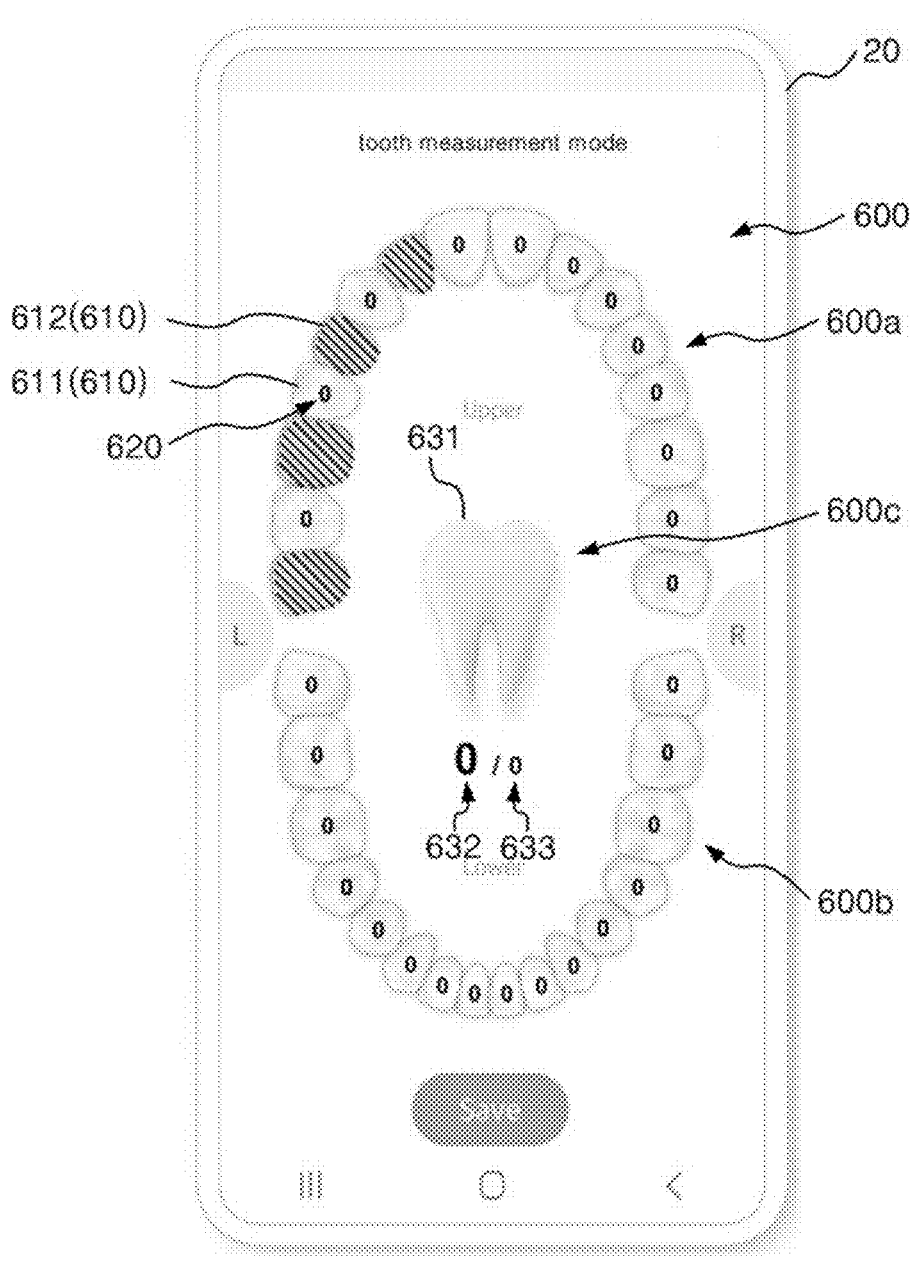
FIGS. 8 to 13 and 17 are diagrams illustrating a shape of a first oral measurement image for collecting state information of user's teeth, according to an embodiment of the present invention.

FIG. 8 illustrates an example of the first oral measurement image 600.

Referring to FIG. 8, the first oral measurement image 600 may include a first measurement image area 600a and a second measurement image area 600b.

The plurality of tooth measurement images 610 corresponding to the user's teeth may be represented in each of the first and second measurement image areas 600a and 600b. Similar to the above, each of the plurality of tooth measurement images 610 may have a unique touch area.

The plurality of upper jaw tooth measurement images 610 corresponding to teeth arranged on the user's upper jaw may be represented in the first measurement image area 600a. The plurality of lower jaw tooth measurement images 610 corresponding to teeth arranged on a user's lower jaw may be represented in the second measurement image area 600b.

In order for the user to easily represent the locations of the plurality of tooth measurement images 610, the first measurement image area 600a may be located on above the first oral measurement image 600, and the second measurement image area 600b may be located below the first oral measurement image 600.

Meanwhile, each of the plurality of tooth measurement images 610 included in the first oral measurement image 600 may be an existing tooth measurement image 611 or a non-existing tooth measurement image 612.

The existing tooth measurement image 611 may correspond to the user's existing teeth. That is, the existing tooth measurement image 611 may represent teeth existing in the user's oral cavity.

The non-existing tooth measurement image 612 may correspond to the user's non-existing teeth. That is, the existing tooth measurement image 612 may represent teeth existing in the user's oral cavity.

The non-existing tooth measurement image 612 may be represented on the first oral measurement image 600 based on information input through the above-described oral image 500 for inputting teeth information. That is, the non-existing tooth measurement image 612 may be represented in the first oral measurement image 600 based on the selection signal sequentially input from the oral image 500 for inputting teeth information.

According to the embodiment, in the first oral measurement image 600, the existing tooth measurement image 611 and the non-existing tooth measurement image 612 may be represented differently. For example, referring to FIG. 8, the existing tooth measurement image 611 may be represented by a white tooth measurement image 610, and the non-existing tooth measurement image 612 may be represented by the tooth measurement image 610 filled with a plurality of diagonal lines. Accordingly, the user can easily distinguish the existing tooth measurement image 611 and the non-existing tooth measurement image 612. However, the present invention is not limited thereto, and the existing tooth measurement image 611 and the non-existing tooth measurement image 612 may be differently represented through different representation methods. For example, the existing tooth measurement image 611 and the non-existing tooth measurement image 612 may be represented by different color values or different brightness values.

Each of the plurality of tooth measurement images 610, in particular, the plurality of existing tooth measurement images 611 may have state information 620. As will be described later, the state information 620 of the tooth measurement image 610 may be information matching the state information of the target tooth measured by the tooth diagnostic device 10.

The state information 620 of each of the plurality of tooth measurement images 610 may have a default value of "0". However, the present invention is not limited thereto. According to another embodiment, the state information 620 of each of the plurality of tooth measurement images 610 may correspond to the state information of each of the plurality of teeth measured in a previous measurement period. That is, the first oral measurement image 600 may include the state information of the tooth result images included in the oral result image in a previous measurement period.

Referring to FIG. 8, the state information 620 of the tooth measurement image 610 may correspond to the above-described state numerical value. In addition, the state information 620 of the tooth measurement image 610 may be represented inside the tooth measurement image 610. In this way, a user may easily associate the state information 620 of the tooth measurement image 610 with the tooth measurement image 610. Meanwhile, the present invention is not limited thereto, and the state information 620 of the tooth measurement image 610 may be represented outside the tooth measurement image 610 adjacent to the tooth measurement image 610.

The first oral measurement image 600 may further include a third measurement image area 600c.

Information related to a target tooth may be represented in the third measurement image area 600c. Here, the target tooth may be a user's tooth located adjacent to a probe of the tooth diagnostic device 10. That is, the target tooth may correspond to a user's tooth whose state information is measured in real time through the tooth diagnostic device 10.

The third measurement image area 600c may be located between the first measurement image area 600a and the second measurement image area 600b. That is, the third measurement image area 600c may be located in the center of the first oral measurement image 600. Accordingly, the user may intensively confirm the information related to the target tooth.

The information related to the target tooth may include a shape image 631 of a target tooth, state information 632 at a current time of a target tooth, and worst state information 633 of a target tooth.

The shape image 631 of the target tooth may be a shape image of the target tooth in which the state information at the current time of the target tooth is reflected.

Meanwhile, as will be described later, the state information of the target tooth may be repeatedly measured n (an integer greater than or equal to 1) times. In this case, the state information 632 at the current time may correspond to the state information measured at the current time of the target tooth, and the worst state information 633 may corresponding to the worst state information among the state information of the target tooth measured up to the current time. When the state information is represented by a state numerical value, the worst state information may be the highest value among the state numerical values. The state information 632 at the current time and the worst state information 633 may have a default value of "0."

Referring back to FIG. 5, steps S202 to S205 may be performed after step S201.

Meanwhile, since a user wants to separately confirm the state information of the user's teeth (or at least some teeth), steps S202 to S205 may be repeatedly performed for each of the user's teeth.

For convenience of description, only steps S202 to S205 performed for one tooth are described in FIG. 5.

In step S202, the user terminal 20 may receive the state information of the target tooth measured from the tooth diagnostic device 10. Similar to the above, the state information of the target tooth may correspond to the state numerical value (or the decay value). In order to increase the accuracy of the measurement of the state information, the user may measure the state information of the target tooth by repeatedly using the tooth diagnostic device 10 n times. In this case, in step S202, the user terminal 20 may sequentially receive the state information of the target tooth n times.

In step S203, the user terminal 20 may receive a selection signal 710 (FIG. 12) for selecting the first tooth measurement image 610b (FIG. 12) from among a plurality of tooth measurement images 610. The first tooth measurement image 610b may be the tooth measurement image 610 that matches the state information of the target tooth.

Meanwhile, although it has been described in FIG. 5 that step S203 is performed after step S202, the present invention is not limited thereto, and step S203 may be performed before step S202.

In step S204, the user terminal 20 may match the state information of the target tooth with the state information 620 of the first tooth measurement image 610b. That is, the state information of the target tooth may be represented by the state information 620 of the first tooth measurement image 610b.

Here, the state information of the matched target tooth may be the worst state information among the state information of the target tooth repeatedly measured n times. That is, in order to measure and represent the state information more accurately, the user terminal 20 may match the worst state information 633 of the target tooth with the state information 620 of the first tooth measurement image 610b.

Meanwhile, as described above, the first oral measurement image 600 may include the plurality of tooth measurement images 610, and each of the plurality of tooth measurement images 610 may include the existing tooth measurement image 611 or the non-existing tooth measurement image 612. However, the situation in which a user incorrectly selects the non-existing tooth measurement image 611 due to a mistake, etc., may occur, and accordingly, the case where the state information of the target tooth may be matched with the non-existing tooth measurement image 612 may occur. Due to this, the user may experience confusion.

Accordingly, according to the embodiment, the non-existing tooth measurement image 612 may be implemented as the tooth measurement image 610 in which a unique touch area does not exist. That is, only the existing tooth measurement image 611 may be implemented as the tooth measurement image 610 in which the unique touch area exists.

Accordingly, when the selection signal of the first tooth measurement image 610b, which is the non-existing tooth measurement image 612, is input, the user terminal 20 may not match the state information of the target tooth with the first tooth measurement image 610b. In addition, when the selection signal of the first tooth measurement image 610b, which is the existing tooth measurement image 611, is input, the user terminal 20 may not match the state information of the target tooth with the first tooth measurement image 610b.

In step S205, the user terminal 20 may represent the state information 620 of the first tooth measurement image 610b in the first oral measurement image 600.

Hereinafter, steps S202 to S205 will be described in detail with reference to FIGS. 9 to 13. In this case, it is assumed that the state information 620 corresponds to the state numerical value, and the number of times of measurement of the state information of the target tooth is three times.

Referring to FIGS. 9 to 13, reference numeral 610b may be the state information 620 of the tooth measurement image 610 represented in the measured first oral measurement image 600.

According to the embodiment, the measured tooth measurement image 610a may be represented differently from the non-measured tooth measurement image 610. For example, referring to FIGS. 9 to 13, a brightness value of the measured tooth measurement image 610a may be represented higher than that of the non-measured tooth measurement image 610. However, the present invention is not limited thereto, and the user terminal 20 may differently represent the measured tooth measurement image 610a and the non-measured tooth measurement image 610 by changing color values and the like.

In addition, according to the embodiment, the state numerical value 620 of the measured tooth measurement image 610a may be represented based on a preset first threshold value. That is, the state numerical value 620 of the measured tooth measurement image 610a exceeding the first threshold value may be differently represented from the state numerical value 620 of the measured tooth measurement image 610a less than or equal to the first threshold value.

Specifically, the first threshold value may be a starting value of a section of a state numerical value corresponding to the above-described third stage, for example, "40." In this case, referring to FIGS. 9 to 13, an underline may be displayed on a lower side of the state numerical value 620 of the measured tooth measurement image 610a exceeding "40," and an underline may not be displayed on the lower side of the state numerical value 620 of the measured tooth measurement image 610a less than or equal to "40". However, the present invention is not limited thereto, and the user terminal 20 may differently represent the state numerical value 620 of the measured tooth measurement image 610a exceeding the first threshold value and the state numerical value 620 of the measured tooth measurement image 610a less than or equal to the first threshold value by changing a color value other than the underline.

According to another embodiment, an edge line of the measured tooth measurement image 610a may be represented based on the first threshold value. That is, similar to the above, the edge line of the measured tooth measurement image 610a exceeding the first threshold value may be differently represented from the edge line of the measured tooth measurement image 610a less than or equal to the first threshold value. Although not illustrated in the drawings, the edge line of the measured tooth measurement image 610a exceeding the first threshold value may be represented in red, and the edge line of the measured tooth measurement image 610a less than or equal to the first threshold value may be represented in black.

Figure 9:
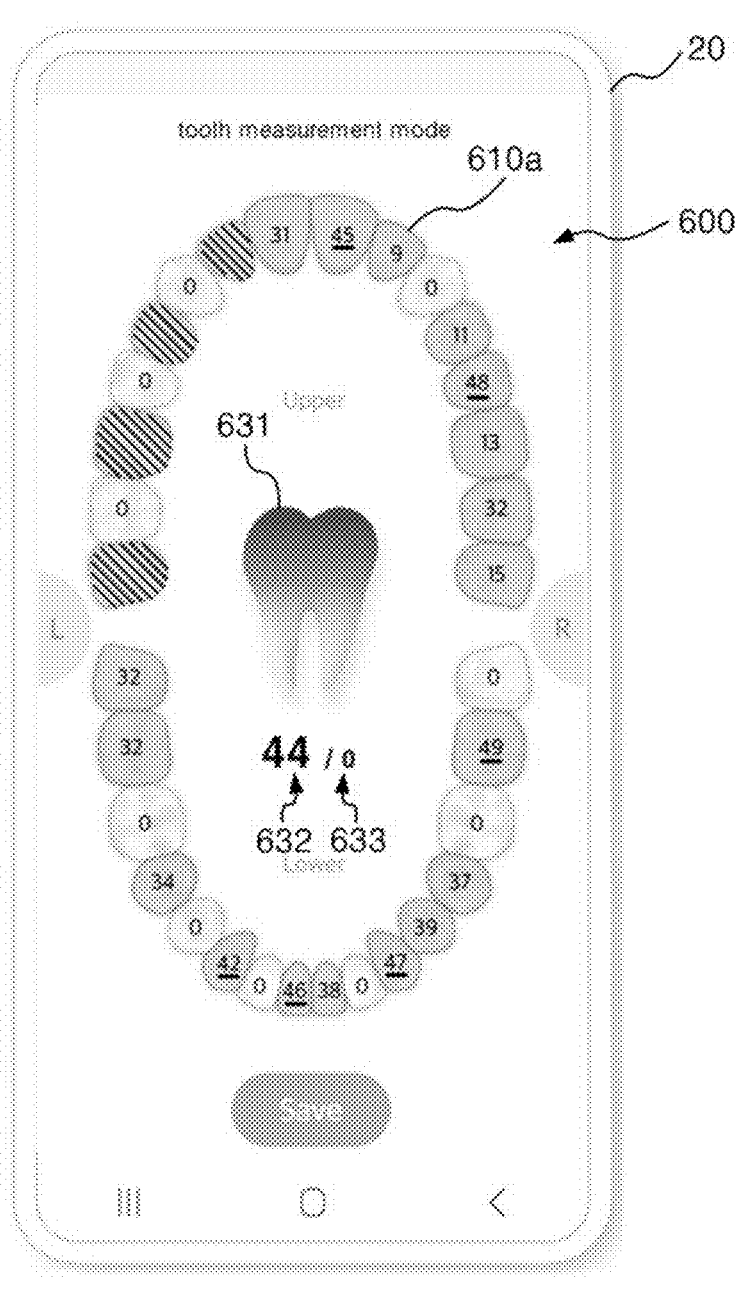

FIG. 9 illustrates the first oral measurement image 600 in measurement once

Referring to FIG. 9, the user terminal 20 may receive state information of a target tooth of "44" from the tooth diagnostic device 10. In addition, the user terminal 20 may represent a state numerical value of "44" in the state information 632 at the current time of the first oral measurement image 600.

Meanwhile, since the state information of the target tooth was first measured, a state numerical value of "0," which is a default value, may be represented in the area of the worst state information 633. In addition, the shape image 631 of the target tooth may represent a brightness value to reflect the state information of the target tooth of "44."

Figure 10:
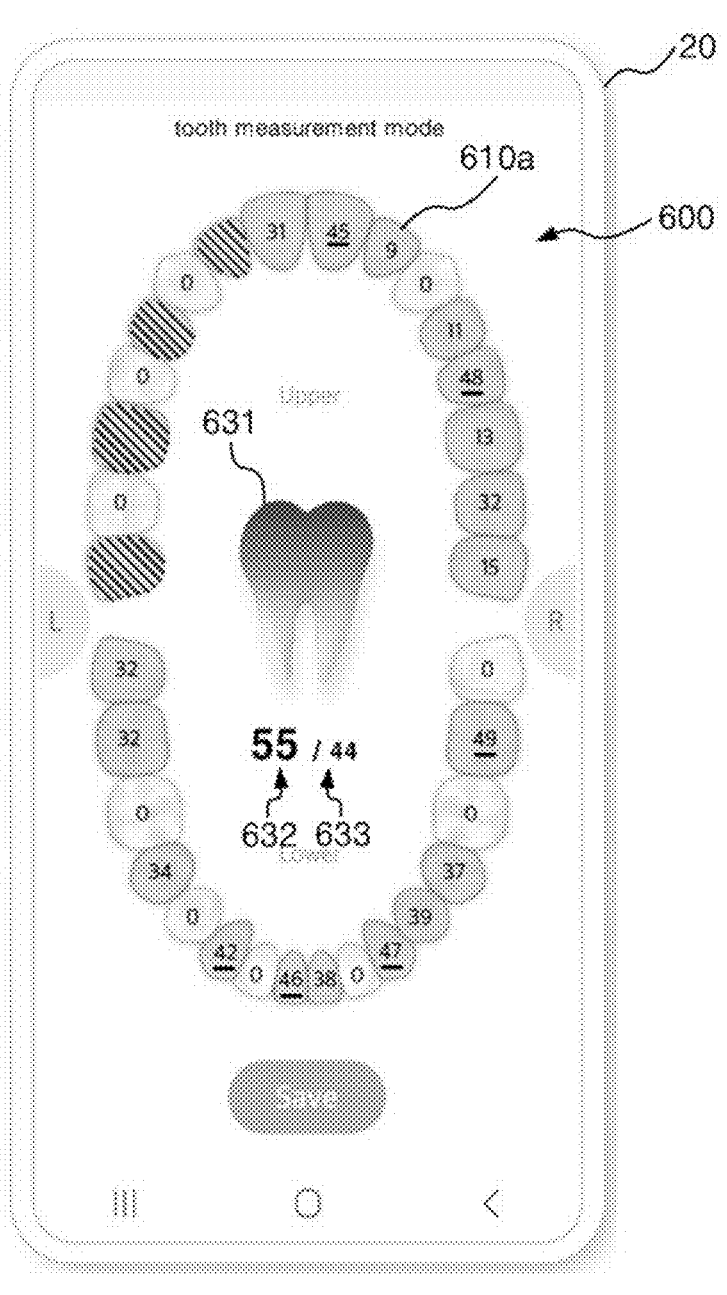

FIG. 10 illustrates the first oral measurement image 600 in measurement twice.

Referring to FIG. 10, the user terminal 20 may receive state information of a target tooth of "55" from the tooth diagnostic device 10. In addition, the user terminal 20 may represent a state numerical value of "55" in the state information 632 at the current time of the first oral measurement image 600.

In addition, the state numerical value of "44" measured in FIG. 9 may be represented in the area of the worst state information 633 of FIG. 10. In addition, the shape image 631 of the target tooth may represent a brightness value to reflect the state information of the target tooth of "55."

Figure 11:
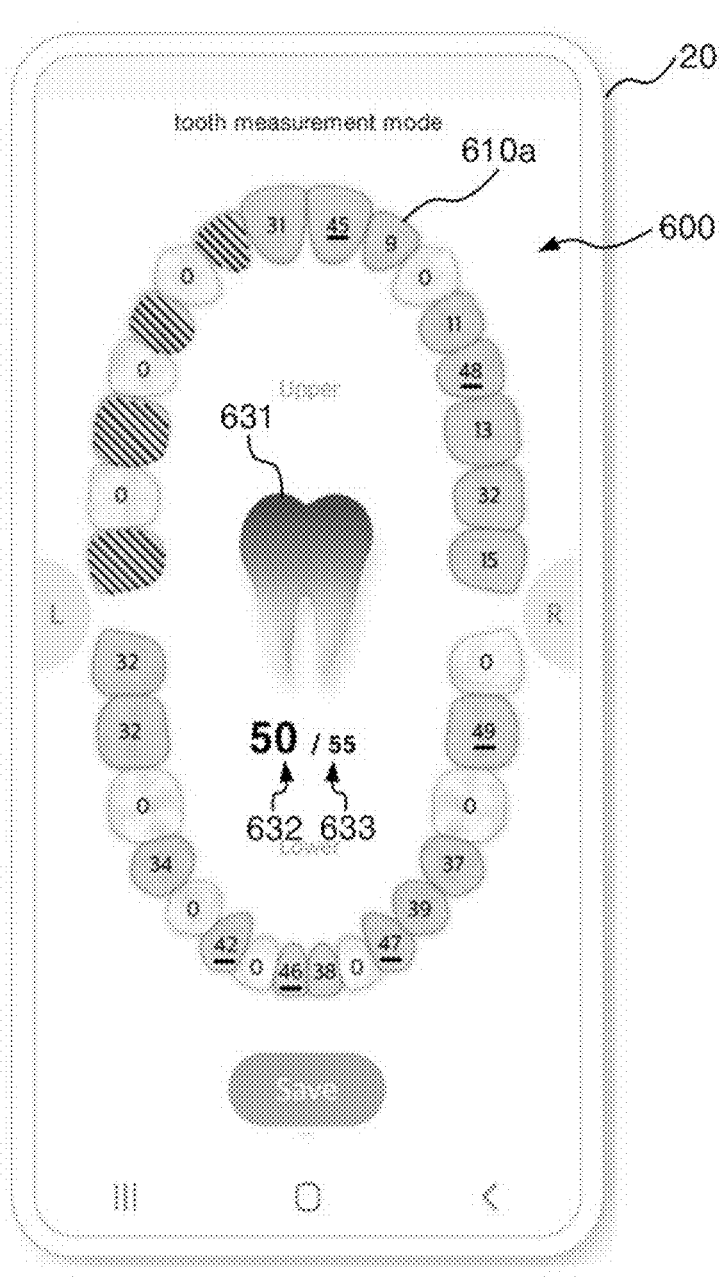

FIG. 11 illustrates the first oral measurement image 600 in measurement three times.

Referring to FIG. 11, the user terminal 20 may receive state information of a target tooth of "50" from the tooth diagnostic device 10. In addition, the user terminal 20 may represent a state numerical value of "50" in the state information 632 at the current time of the first oral measurement image 600.

In addition, the state numerical value of "55," which is the worst state information (i.e., the highest state numerical value), among the state information measured up to twice may be represented in the area of the worst state information 633 of FIG. 11. In addition, the shape image 631 of the target tooth may represent a brightness value to reflect the state information of the target tooth of "50."

In other words, referring to FIGS. 9 to 11, when measuring at i times out of n times, the worst state information (i.e., the highest state numerical value) among the state information of the target tooth measured at i times and the state information of the target tooth measured up to i times may each be represented in the third measurement image area 600c.

Figure 12:
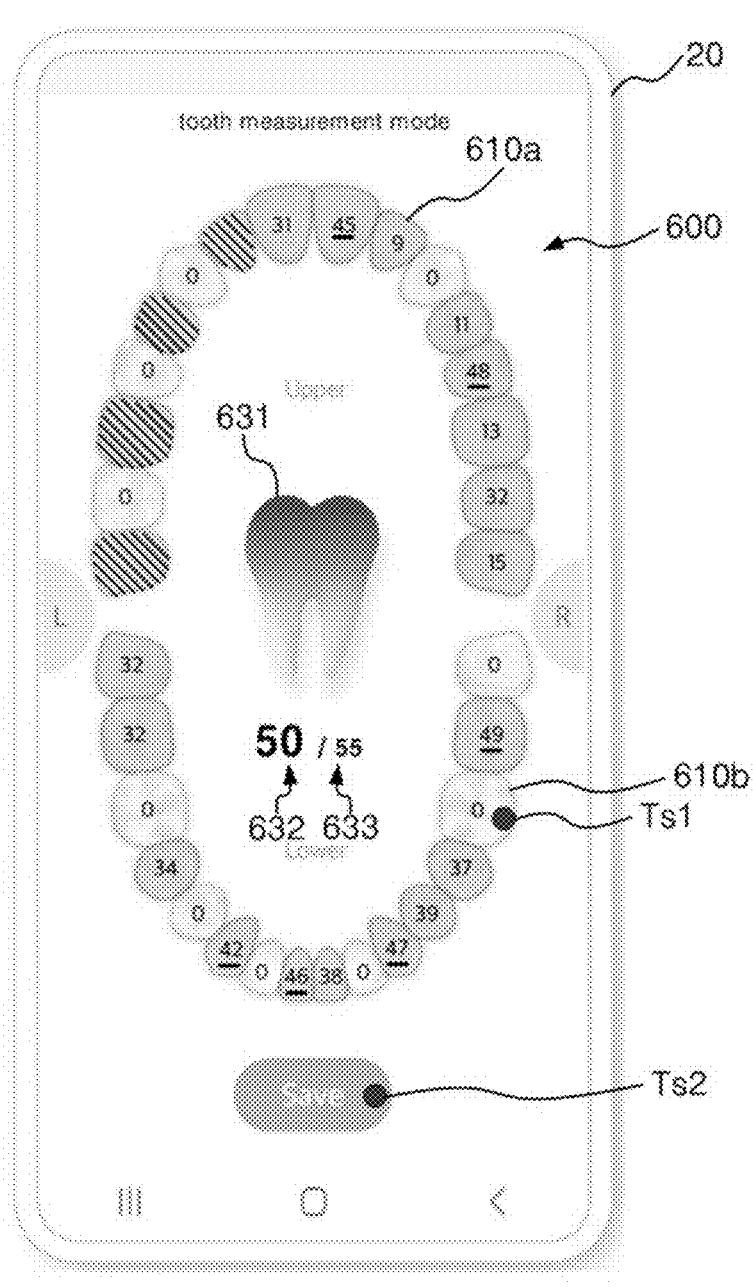

FIG. 12 illustrates the concept of matching the state information.

Referring to FIG. 12, a user may input a first selection signal Ts1 for selecting a first tooth measurement image 610b from among a plurality of tooth measurement images 610 to the touch display unit 230. In addition, the user may input a second selection signal Ts2 for selecting a save button to the touch display unit 230. Meanwhile, according to another embodiment, the user terminal 20 may further include a microphone, and the first selection signal Ts1 may be a user's voice signal. That is, the user may select the tooth measurement image 610b by outputting a voice corresponding to the known tooth number.

Figure 13:
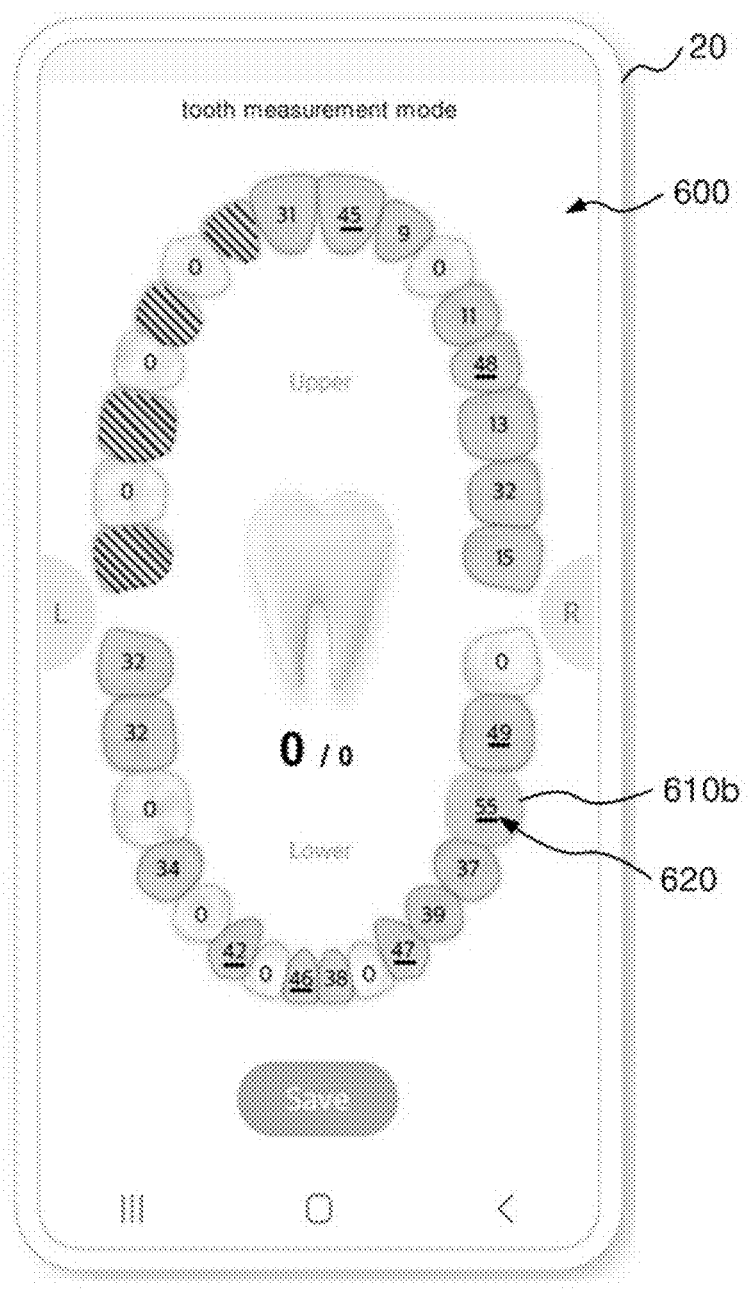

FIG. 13 illustrates the state information 620 of the first tooth measurement image 610b represented in the first oral measurement image 600.

Referring to FIG. 13, the state numerical value of "55," which is the worst state information (i.e., the highest state numerical value), among the state information measured up to three times, is represented in the state information 620 of the first tooth measurement image 610b.

In other words, the user terminal 20 may match the worst state information among the state information of the target tooth measured n times with the state information 620 of the first tooth measurement image 610b.

Figure 14:
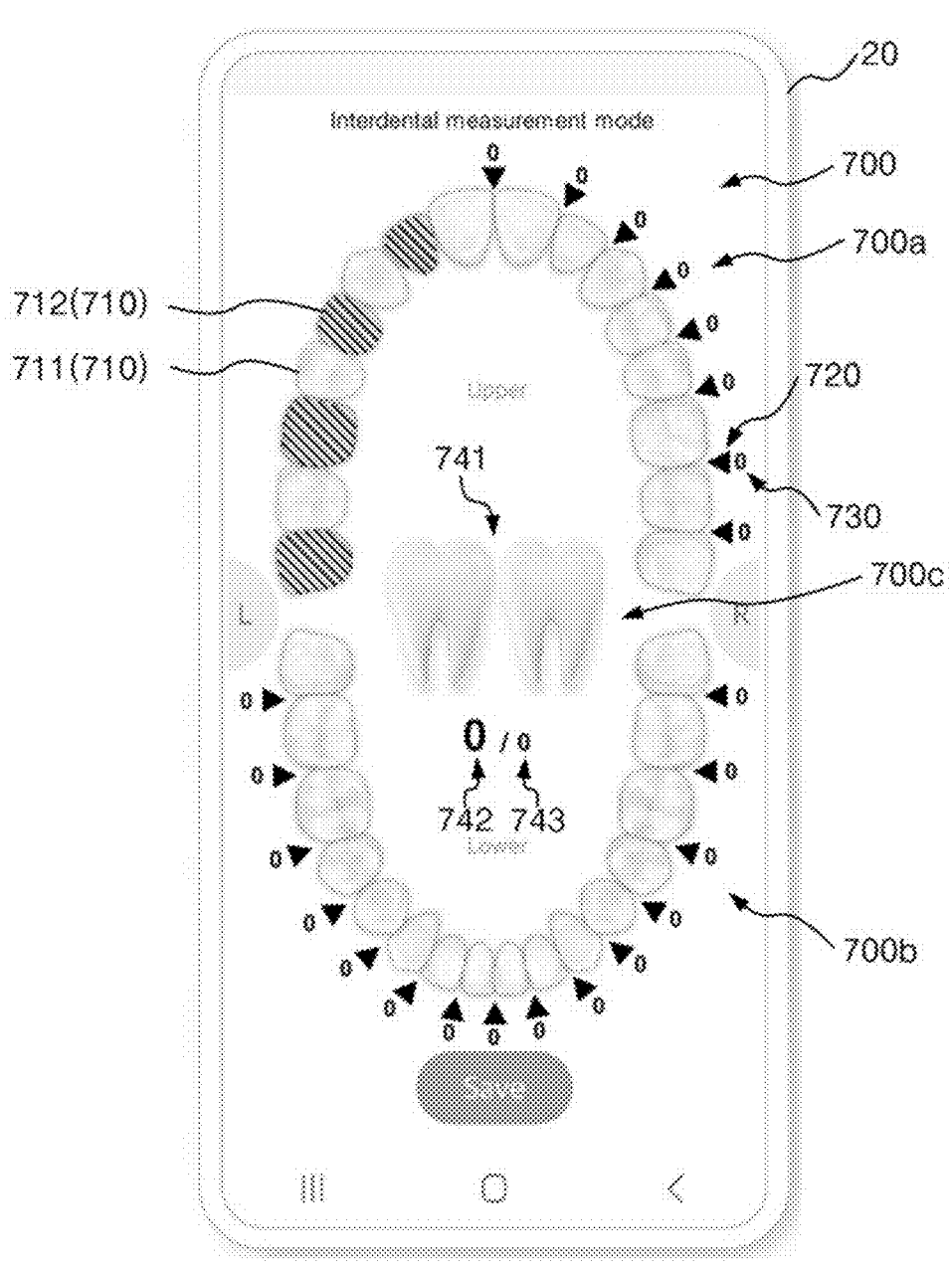
FIGS. 14 to 16 are diagrams illustrating a shape of a second oral measurement image for collecting state information of a user's interdental region, according to an embodiment of the present invention.
Figure 15:
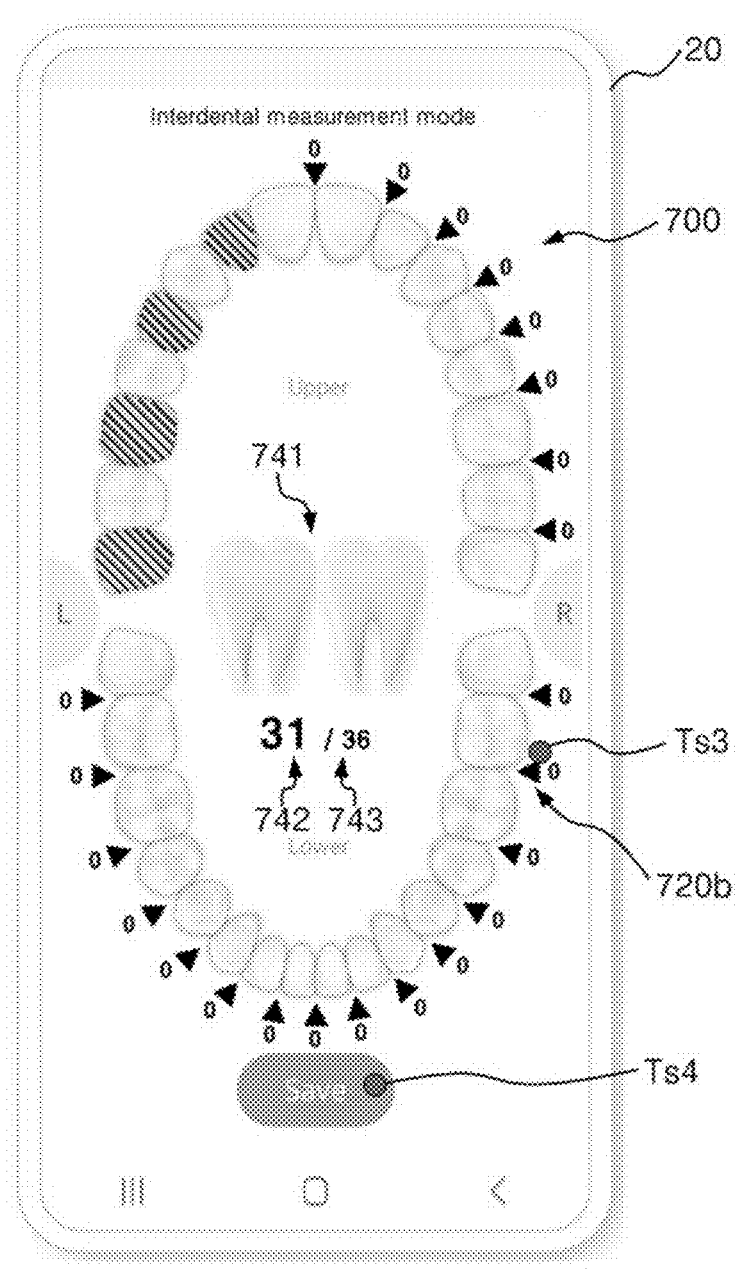
Figure 16:
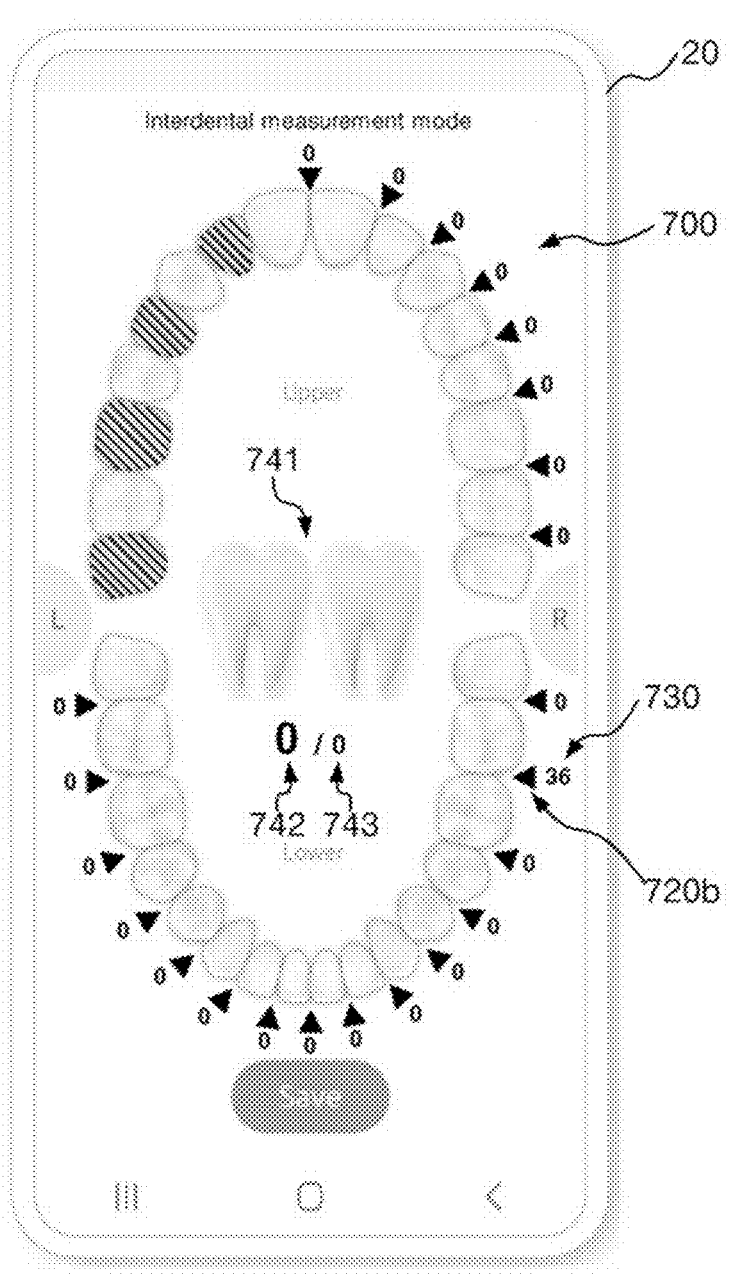

FIG. 6 is a diagram illustrating a flowchart of a detailed step for the collection of the state information of the interdental region in step S20 according to an embodiment of the present invention, and FIGS. 14 to 16 are diagrams illustrating a shape of a second oral measurement image 700 for collecting the state information of the interdental region of the user.

In step S206, the user terminal 20 may output (i.e., display) the second oral measurement image 700 including a plurality of tooth shape images 710 and a plurality of measurement indicators 720 to the touch display unit 230.

FIG. 14 illustrates an example of the second oral measurement image 700.

Referring to FIG. 14, the second oral measurement image 700 may include a fourth measurement image area 700a and a fifth measurement image area 700b.

The plurality of tooth shape images 710 corresponding to user's teeth may be represented in the fourth and fifth measurement image areas 700a and 700b. However, each of the plurality of tooth shape images 710 does not have a unique touch area.

A plurality of upper jaw tooth shape images 710 corresponding to teeth arranged on a user's upper jaw may be represented in the fourth measurement image area 700a. The plurality of lower jaw tooth measurement images 610 corresponding to user's teeth arranged on a user's lower jaw may be represented in the fifth measurement image area 600b. The fourth measurement image area 700a may be located above the second oral measurement image 700, and the fifth measurement image area 700b may be located below the second oral measurement image 700. Meanwhile, each of the plurality of tooth shape images 710 included in the second oral measurement image 700 may be an existing tooth measurement image 711 or a non-existing tooth measurement image 712. Since this is similar to the above, a detailed description thereof will be omitted.

In addition, the fourth and fifth measurement image areas 700a and 700b may include a plurality of measurement indicators 720 indicating the user's interdental region. The measurement indicator 720 may represent an interdental region that is a region between the tooth shape images 710 adjacent to each other.

Each of the plurality of measurement indicators 720 may have a unique touch area. Each of the plurality of measurement indicators 720 may have state information 730. The state information 730 of each of the plurality of tooth measurement images 720 may have a default value of "0."

The state information 730 of the measurement indicator 720 may correspond to a state numerical value. In addition, the state information 730 of the measurement indicator 720 may be located adjacent to the measurement indicator 720. In this way, a user may easily associate the state information 730 of the measurement indicator 720 with the measurement indicator 720.

The second oral measurement image 700 may further include a sixth measurement image area 700c. The sixth measurement image area 700c may be located between the fourth measurement image area 700a and the fifth measurement image area 600b.

Information related to a target interdental region may be represented in the sixth measurement image area 700c. Here, the target interdental region is defined as the interdental region of the user that the tooth diagnostic device 10 is in contact with. That is, the target interdental region may correspond to the interdental region of the user whose state information is measured in real time through the tooth diagnostic device 10.

The information related to the target interdental region may include a shape image 741 of the target interdental region, state information 742 at a current time of the target interdental region, and worst state information 743 of the target interdental region.

The shape image 741 of the target interdental region may be a shape image of the target interdental region in which real-time state information of the target interdental region is reflected.

Meanwhile, similar to the above-described measurement of state information of a tooth, the state information of the target interdental region may be repeatedly measured n times. In this case, the state information 742 at the current time may correspond to the state information measured at the current time of the target interdental region, and the worst state information 743 may corresponding to the worst state information among the state information of the target interdental region measured up to the current time. When the state information is represented by a state numerical value, the worst state information may be the highest value among the state numerical values. The state information 742 at the current time and the worst state information 743 may have a default value of "0."

Referring back to FIG. 6, steps S207 to S210 may be performed.

Meanwhile, since the user wants to separately confirm the state information of the interdental region (or at least a part of the interdental region) of the user using the tooth diagnostic device 10, steps S207 to S210 may be repeatedly performed on each of at least an interdental region of the user.

For convenience of description, only steps S207 to S210 performed on one interdental region will be described in FIG. 6.

In step S207, the user terminal 20 may receive the state information of the target tooth measured from the tooth diagnostic device 10. Similar to the above, the state information of the target interdental region may correspond to the state numerical value.

Meanwhile, in order to increase the accuracy of the measurement of the state information, the user may measure the state information of the target interdental region by repeatedly using the tooth diagnostic device 10 n times. In this case, in step S207, the user terminal 20 may sequentially receive the state information of the interdental region n times.

In step S208, the user terminal 20 may receive a selection signal 730 (FIG. 15) for selecting a first tooth measurement image 720b (FIG. 15) from among the plurality of tooth measurement images 720. The first measurement indicator 720b may be the measurement indicator 720 matching the state information of the target interdental region.

Meanwhile, although it has been described in FIG. 6 that step S203 is performed after step S207, the present invention is not limited thereto, and step S208 may be performed before step S207.

In step S209, the user terminal 20 may match the state information of the target interdental region with the state information 730 of the first measurement indicator 720b.

Here, the state information of the matched target interdental region may be the worst state information among the state information of the target interdental region repeatedly measured n times. That is, in order to measure and represent the state information more accurately, the user terminal 20 may match the worst state information 742 of the target interdental region with the state information 730 of the first measurement indicator 720b.

In step S210, the user terminal 20 may represent the state information 730 of the first measurement indicator 720b in the first oral measurement image 700.

Hereinafter, steps S207 to S210 will be described in detail with reference to FIGS. 15 and 16. In this case, it is assumed that the state information 730 corresponds to the state numerical value, and the number of times of measurement of the state information of the target interdental region is three times.

Meanwhile, although not illustrated in the drawings, the state information 730 of the measurement indicator 720 corresponding to the measured interdental region based on the preset first threshold value may be differently represented (e.g., underlined) from the state information 730 of the measurement indicator 720 corresponding to the non-measured interdental region. Since this is similar to the above, a detailed description thereof will be omitted.

FIG. 15 illustrates the second oral measurement image 700 in measurement three times Since the second oral measurement image 700 in measurement once and twice is similar to the description of FIGS. 9 and 10 described above and the description of FIG. 15 that will be described later, a detailed description thereof will be omitted.

Referring to FIG. 15, the user terminal 20 may receive state information of a target interdental region of "31" from the tooth diagnostic device 10. In addition, the user terminal 20 may represent a state numerical value of "31" in the state information 742 at the current time of the second oral measurement image 700.

In addition, the state numerical value of "36," which is the worst state information (i.e., the highest state numerical value), among the state information measured up to twice may be represented in the area of the worst state information 743 of FIG. 15. Also, although not illustrated, the brightness value of the shape image 741 of the target interdental region may be represented to reflect the state information of the target interdental region of "31."

In addition, a user may input a third selection signal Ts3 for selecting the first measurement indicator 720b among the plurality of measurement indicators 720 to the touch display unit 230. In addition, the user may input a fourth selection signal Ts4 for selecting a save button to the touch display unit 230.

FIG. 16 illustrates the state information 730 of the first measurement indicator 720b represented in the second oral measurement image 700. Referring to FIG. 16, the state numerical value of "36," which is the worst state information (i.e., the highest state numerical value), among the state information of the interdental region measured up to three times, is represented in the state information 730 of the first measurement indicator 720b.

In other words, the user terminal 20 may match the worst state information among the state information of the target interdental region measured n times with the state information 730 of the first measurement indicator 720b.

Meanwhile, the first oral measurement image 600 and the second oral measurement image 700 may be integrated into one integrated oral measurement image 800. That is, according to the embodiment, the user terminal 20 may output only one integrated oral measurement image 800 without outputting the first oral measurement image 600 and the second oral measurement image 700 separately.

Figure 17:
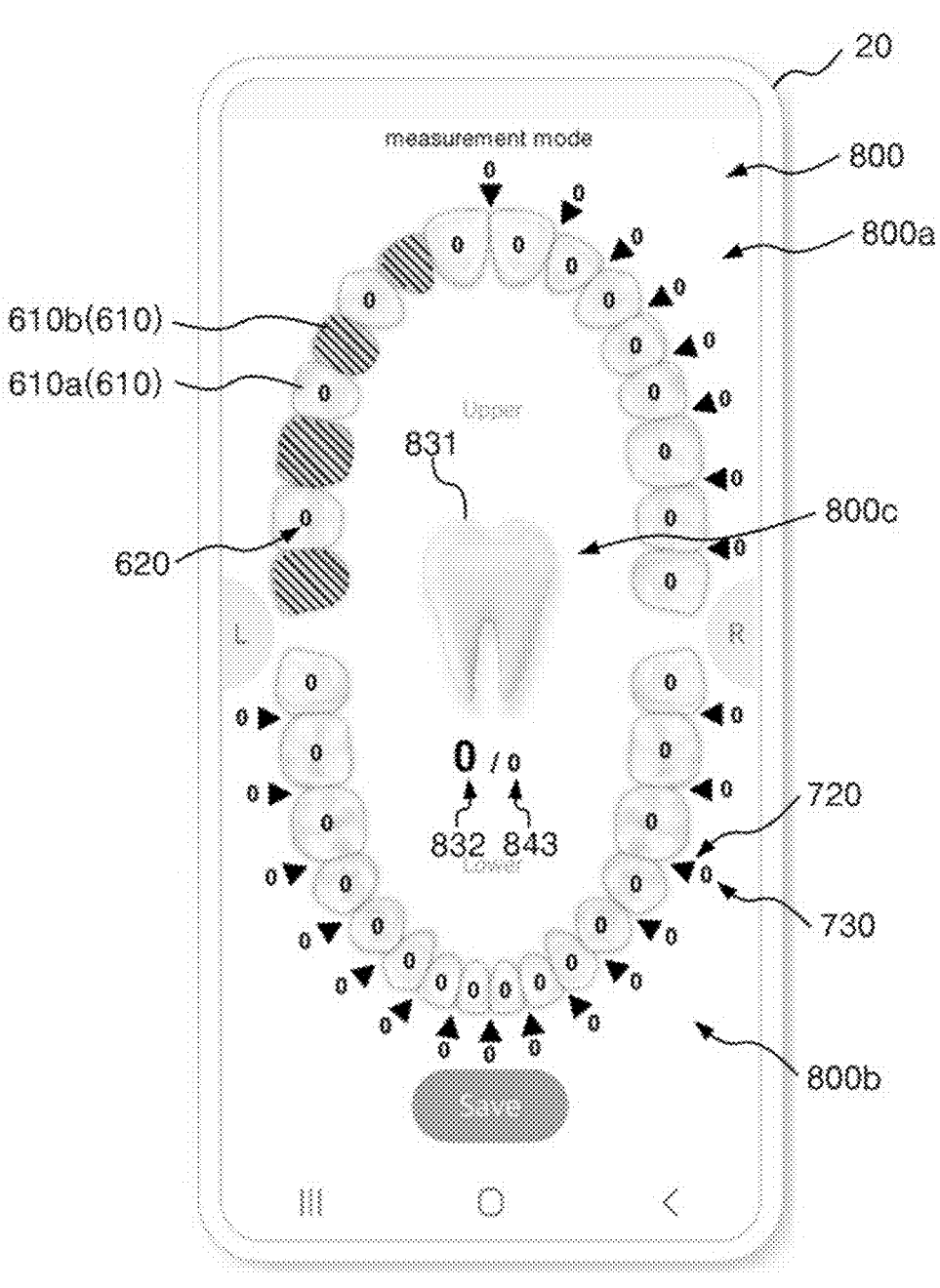

Specifically, referring to FIG. 17, the integrated oral measurement image 800 may include a seventh measurement image area 800*a*, an eighth measurement image area 800*b*, and a ninth measurement image area 800*c*.

The seventh measurement image area 800*a* may include the plurality of upper jaw tooth measurement images 610 and the plurality of measurement indicators 720 corresponding to teeth arranged on a user's upper jaw. The eighth measurement image area 800*b* may include the plurality of upper jaw tooth measurement images 610 and the plurality of measurement indicators 720 corresponding to teeth arranged on a user's lower jaw. The information related to the target tooth and the target interdental region may be represented in the ninth measurement image area 800*c*. The information related to the target tooth and the target interdental region may include a shape image 831 of any one of the target tooth and the target interdental region, state information 832 at a current time of any one of the target tooth and the target interdental region, and worst state information 833 of any one of the target tooth and target interdental region. This refers to the description above.

In addition, by outputting the integrated oral measurement image 800, steps S201 to S205 and steps S206 to S210 may be integrated. This refers to the description above.

Referring back to FIG. 4, in step S30, the user terminal 20 may calculate and output (i.e., display) the first oral result state information based on the teeth-related state information.

Specifically, the first oral result state information may be calculated by combining the state information of the user's teeth and the state information of at least one interdental region. The first oral result state information may be represented as a first oral result image.

Hereinafter, the first oral result image corresponding to the first oral result state information will be described in detail with reference to FIG. 18, and the concept of calculating the first oral result state information will be described in detail with reference to FIGS. 19, 20 and 21.

Figure 18:
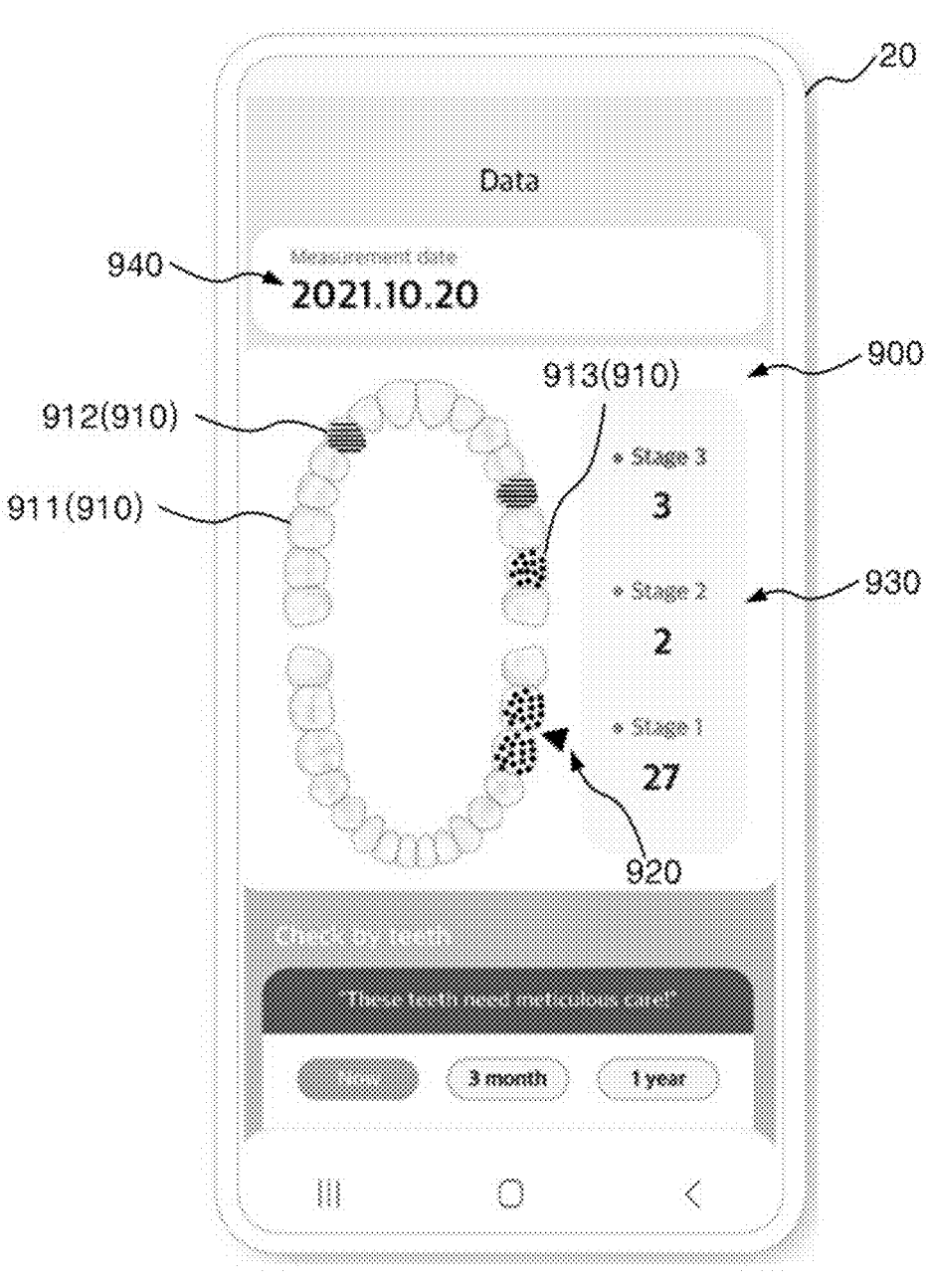
FIG. 18 is a diagram illustrating a first oral result image corresponding to first oral result state information, according to an embodiment of the present invention.

FIG. 18 is a diagram illustrating a first oral result image 900 corresponding to first oral result state information, according to an embodiment of the present invention.

Meanwhile, the first oral result image 900 illustrated in FIG. 18 may be an embodiment not related to FIGS. 9 to 17 described above.

Referring to FIG. 18, the first oral result image 900 may include a plurality of tooth result images 910 having a tooth shape.

Each of the tooth result images 910 may have a unique touch area. Therefore, when a user touches a touch area of any one of the plurality of tooth result images 910, detailed information (for example, state numerical value for any one tooth result image 910, etc.) on any one tooth result image 910 may be represented.

The tooth result image 910 may include the result state information. The state information of the tooth result image 910 may be represented in a plurality of stages differently from the above-described state information of teeth and interdental region. Accordingly, a user can more easily grasp the result state information of the tooth result image 910.

Specifically, the tooth result image 910 may be any one of a first tooth result image 911, a second tooth result image 912, and a third tooth result image 913.

The first tooth result image 911 may be the tooth result image 910 that may correspond to a first stage, that is, the caries good stage. For example, the tooth result image 910 having a state numerical value between 0 and 19 points may be represented as the first tooth result image 911.

The second tooth result image 912 may be the tooth result image 910 that may correspond to a second stage, that is, the carries attention stage. For example, the tooth result image 912 having a state numerical value between 20 and 39 points may be represented as the second tooth result image 912.

The third tooth result image 913 may be the tooth result image 910 that may correspond to a third stage, that is, the carries risk stage. For example, the tooth result image 910 having a state numerical value greater than or equal to 40 points may be represented as the third tooth result image 913.

And, as illustrated in FIG. 18, the first, second and third tooth result images 911, 912, and 913 may be differently represented in the first oral result image 900. That is, the first tooth result image 911 may be represented as a white tooth image on the first oral result image 900, the second tooth result image 912 may be represented as a tooth image filled with a horizontal line, and the third tooth result image 913 may be represented as a tooth image filled with dots. However, the present invention is not limited thereto, and the user terminal 20 may differently represent the first, second, and third tooth result images 911, 912, and 913 by changing a color value, a brightness value, etc.

Meanwhile, the result state information of the tooth result image 910 may be calculated based on the state information (i.e., state information 620 of tooth measurement image 610) of the tooth described with reference to FIGS. 8 to 13 and the state information (i.e., the state information 730 of the measurement indicator 720) of the interdental region described with reference to FIGS. 14 to 16. Here, the state information of the tooth and/or the interdental region may be the worst state information of the corresponding tooth measurement image 610 and/or the corresponding measurement indicator 720.

That is, according to the embodiment, among the tooth result images, the result state information of the first tooth result image 910 corresponds to the worst state information among the state information of the first tooth measurement image 610 and the state information of the first measurement indicator 720. A detailed description thereof will be provided later.

Meanwhile, the first oral result image 900 may further include at least one result indicator 920.

The result indicator 920 may be included in the first oral result image 900 to indicate the tooth abnormality state information of the interdental region between adjacent tooth result images 910. Accordingly, when there is no abnormal state in the interdental region between all the tooth result images 910, the result indicator 920 may be omitted from the first oral result image 900. That is, the first oral result image 900 may selectively include at least one result indicator 920.

According to the embodiment, the abnormal state of the interdental region may be represented in the first oral result image 900 when the interdental region exceeds a preset second threshold value. For example, the second threshold value may be a starting value of a section of the state numerical value corresponding to the above-described second stage, for example, "20." That is, when the state numerical value of the specific measurement indicator 720 exceeds 20 points, the result indicator 920 corresponding to the specific measurement indicator 720 may be represented in the first oral result image 900.

Each result indicator 920 may have a unique touch area. Therefore, when a user touches the touch area of the result indicator 920, the detailed information (e.g., the state numerical value of the measurement indicator 720 corresponding to the result indicator 920, etc.) of the result indicator 920 may be represented.

In addition, the first oral result image 900 may include various types of additional information areas 930 and 940. For example, the number of teeth for each stage may be represented in the first additional information area 930, and a date of a first measurement period may be represented in the second additional information area 940.

Hereinafter, the concept of the result state information and result indicator 920 of the tooth result image 910 will be described with reference to FIGS. 19, 20 and 21.

Figure 19:
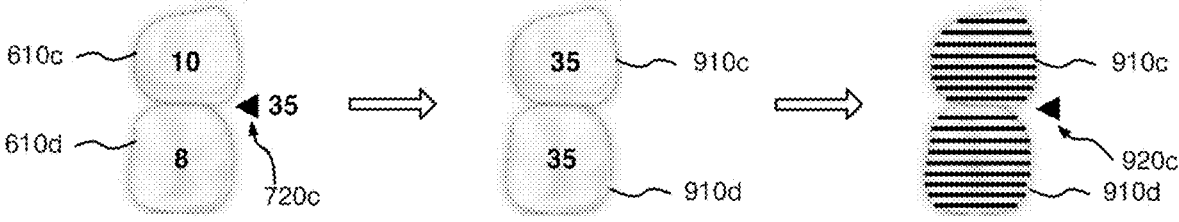
FIGS. 19, 20 and 21 is a diagram for describing a concept of result status information and a result indicator of a tooth result image, according to an embodiment of the present invention.
Figure 20:
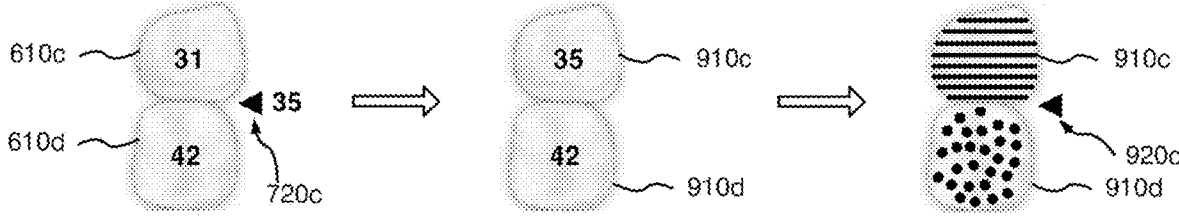
Figure 21:
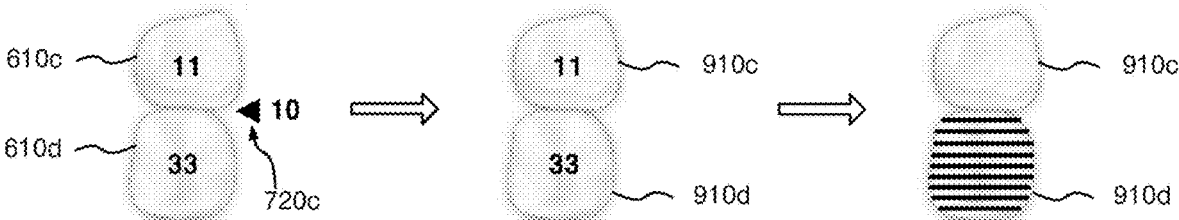

FIGS. 19, 20 and 21 are diagrams for describing the concept of the result state information and the result indicator 920 of the tooth result image 910, according to an embodiment of the present invention. In this case, it is assumed that the teeth of FIGS. 19, 20 and 21 are posterior teeth, and the embodiment is not related to FIG. 18.

A left area of FIGS. 19, 20 and 21 illustrates state information of tooth measurement images 610c and 610d corresponding to measured state information of a tooth, and state information of a measurement indicator 720c corresponding to measured state information of an interdental region. In addition, a right area of FIGS. 19, 20 and 21 illustrates state information of the tooth result images 810c and 810d and state information of a result indicator 920c.

Referring to FIG. 19, a state numerical value of a tooth measurement image c 610c is 10 points, a state numerical value of a tooth measurement image d 610d is 8 points, and a state numerical value of a measurement indicator c 720c is 35 points. In this case, it may be determined that teeth corresponding to each of the tooth measurement image c 610c and tooth measurement image d 610d do not have caries on the buccal, lingual, and/or occlusal surfaces, and caries have occurred in the interdental region of the teeth. Meanwhile, it should be understood that cavities in the interdental region are also included in cavities of teeth.

Therefore, the user terminal 20 may compare the state numerical value of the tooth measurement images c and d 610c and 610d with the state numerical value of the measurement indicator c 720c, thereby finally confirming the state numerical values of the tooth measurement images c and d 610c and 610d. That is, since the state numerical values of the tooth measurement images c and d 610c and 610d are less than the state numerical values of the measurement indicator c 720c, the state numerical values of the tooth measurement images c and d 610c and 610d may change to 35 points which are the state numerical value of the measurement indicator c 720c. Therefore, the user terminal 20 may represent the tooth measurement images c and d 610c and 610d in the first oral result image 900 based on the finally confirmed state numerical values of the tooth measurement images c and d 610c and 610d (see the right area of FIG. 19).

In addition, since the state numerical value of the measurement indicator c 720c exceeds 20 points (i.e., the second threshold value), the result indicator 920c corresponding to the measurement indicator c 720c may be represented in the first oral result image 900 (see the right area of FIG. 19).

Referring to FIG. 20, the state numerical value of the tooth measurement image c 610c is 31 points, the state numerical value of the tooth measurement image d 610d is 42 points, and the state numerical value of the measurement indicator c 720c is 35 points. In this case, it may be determined that teeth corresponding to each of the tooth measurement image c 610c and tooth measurement image d 610d have caries that have occurred in the interdental region of the teeth as well as the buccal, lingual, and/or occlusal surfaces.

In this case, since the state numerical value of the tooth measurement image c 610c is less than the state numerical value of the measurement indicator c 720c, the state numerical value of the tooth measurement image c 610c may change to 35 points that are the state numerical value of the measurement indicator c 720 c. However, since the state numerical value of the tooth measurement image d 610d is greater than the state numerical value of the measurement indicator c 720c, the state numerical value of the tooth measurement image d 610d may be maintained. Therefore, the user terminal 20 may represent the tooth measurement images c and d 610c and 610d in the first oral result image 900 based on the finally confirmed state numerical values of the tooth measurement images c and d 610c and 610d (see the right area of FIG. 20).

In addition, since the state numerical value of the measurement indicator c 720c exceeds 20 points (i.e., the second threshold value), the result indicator 920c corresponding to the measurement indicator c 720c may be represented in the first oral result image 900 (see the right area of FIG. 20).

Referring to FIG. 21, the state numerical value of the tooth measurement image c 610c is 11 points, the state numerical value of the tooth measurement image d 610d is 33 points, and the state numerical value of the measurement indicator c 720c is 10 points. In this case, it may be determined that teeth corresponding to the tooth measurement image d 610d have cavities that have occurred on the buccal, lingual, and/or occlusal surfaces.

In this case, since the state numerical values of the measurement images c and d 610c and 610d are greater than the state numerical value of the measurement indicator c 720c, the state numerical values of the tooth measurement images c and d 610c and 610d may be maintained. Therefore, the user terminal 20 may represent the tooth measurement images c and d 610c and 610d in the first oral result image 900 based on the finally confirmed state numerical values of the tooth measurement images c and d 610c and 610d (see the right area of FIG. 21).

In addition, since the state numerical value of the measurement indicator c 720c is less than 20 points (i.e., the second threshold value), the result indicator 920c corresponding to the measurement indicator c 720c may be represented in the first oral result image 900 (see the right area of FIG. 21).

In addition, embodiments of the present invention may be implemented in a form of program commands that may be executed through various computer means and may be recorded in a computer-readable recording medium. The computer-readable recording medium may include program commands, data files, data structures or the like, alone or a combination thereof. The program commands recorded in the computer-readable recording medium may be especially designed and configured for the present invention or be known to those skilled in a field of computer software. Examples of the program commands include a high-level language code capable of being executed by a computer using an interpreter, or the like, as well as a machine language code made by a compiler. The above-described hardware device may be constituted to be operated as one or more software modules to perform operations according to embodiments of the present invention, and vice versa.

According to the present invention, it is possible to simply and easily provide a tooth state to a user based on a user's teeth-related state information measured by a tooth diagnostic device.

In addition, it should be understood that the effects of the present invention are not limited to the above-described effects, and include all effects that can be inferred from the configuration of the invention described in the detailed description or claims of the present invention.

As described above, in the present invention, although specific matters such as detailed components and the like have been described with reference to limited embodiments and drawings, they have been provided only for assisting in the entire understanding of the present invention. Therefore, the present invention is not limited to the embodiments. Various modifications and changes may be made by those skilled in the art to which the present invention pertains from this description. Therefore, the spirit of the present invention should not be limited to these embodiments, but the claims described below and all of modifications equal or equivalent to the claims are intended to fall within the scope and spirit of the present invention.

What is claimed is:

1. A method of managing teeth performed in a processor-based device, the method comprising steps of:

displaying a first oral measurement image including tooth measurement images in a tooth shape to measure state information of each of user's teeth;

receiving state information of a target teeth of the user measured from a tooth diagnostic device;

receiving a selection signal input for selecting a first tooth measurement image from among the tooth measurement images;

matching state information of the target tooth with state information of the first tooth measurement image; and representing the state information of the first tooth measurement image in the first oral measurement image, wherein the step of the receiving state information of the target teeth sequentially receives the state information of the target tooth measured n times, wherein the step of the matching state information of the target tooth matches worst state information among the state information of the target tooth measured n times with the state information of the first tooth measurement image, wherein the first oral measurement image includes first, second, and third measurement image areas, wherein upper jaw tooth measurement images corresponding to teeth arranged on an upper jaw of the user among the tooth measurement images are represented in the first measurement image area, wherein lower jaw tooth measurement images corresponding to teeth arranged on a lower jaw of the user among the tooth measurement images are represented in the second measurement image area, wherein, in the third measurement image area, information related to the target tooth is represented, and wherein when the measurement is performed at i times out of the n times, the worst state information among the state information of the target tooth measured at the i times and the state information of the target tooth measured up to the i times is represented in the third measurement image area.

2. The method of claim 1, wherein among the tooth measurement images, an non-existing tooth measurement image corresponding to non-existing tooth in the user's oral cavity and a existing tooth measurement image corresponding to a existing tooth of the user's oral cavity are represented differently from each other.

3. The method of claim 2, wherein when the selection signal of the first tooth measurement image, which is the non-existing tooth measurement image, is input, the state information of the target tooth does not match the first tooth measurement image, and wherein when the selection signal of the first tooth measurement image, which is the existing tooth measurement image, is input, the state information of the target tooth is matched with the first tooth measurement image.

4. The method of claim 2, further comprising a step of:

prior to the step of the displaying of the first oral measurement image, displaying an oral image for inputting teeth information for receiving information on the teeth that do not exist in the user's oral cavity.

5. The method of claim 4, further comprising a step of:

after the step of the displaying of the oral image for inputting teeth information, receiving a selection signal input for sequentially selecting one or more tooth images from among tooth images included in the oral image for inputting teeth information, wherein the non-existing tooth measurement image is represented in the first oral measurement image based on the selection signal sequentially selected.

6. The method of claim 1, wherein the first measurement image area is represented in an upper portion of the first oral measurement image, wherein the second measurement image area is represented in a lower portion of the first oral measurement image, and wherein the third measurement image area is represented between the first and second measurement image areas.

7. The method of claim 1, wherein a shape image of the target tooth in which the state information of the target tooth measured at the i time is reflected is further represented in the third measurement image area.

8. The method of claim 1, wherein the state information of the first tooth measurement image is represented inside the first tooth measurement image or outside the first tooth measurement image adjacent to the first tooth measurement image.

9. The method of claim 8, wherein the state information of the first tooth measurement image is represented by a tooth state numerical value, and wherein when the tooth state numerical value of the first tooth measurement image exceeds a preset threshold value, the tooth state numerical value of the first tooth measurement image is differently represented from tooth state numerical value of the other tooth measurement image that is less than or equal to the threshold value.

10. The method of claim 8, wherein the state information of the first tooth measurement image is represented by the tooth state numerical value, and wherein when the tooth state numerical value of the first tooth measurement image exceeds the preset threshold value, an edge line of the first tooth measurement image is differently represented from an edge line of the other tooth measurement image having a state numerical value less than or equal to the threshold value.

11. The method of claim 1, further comprising steps of:

displaying a second oral measurement image including a measurement indicator indicating an interdental region to measure state information of the interdental region of the user;

receiving state information of a target interdental region of the user measured from the tooth diagnostic device;

receiving a selection signal input for selecting a first measurement indicator from among the measurement indicators;

matching the state information of the target interdental region with state information of the first measurement indicator; and representing the state information of the first measurement indicator in the second oral measurement image.

12. The method of claim 11, wherein the second oral measurement image further includes a plurality of tooth shape images, wherein the first measurement indicator represents a region between first and second tooth shape images corresponding to the target interdental region among the plurality of tooth shape images, and wherein the state information of the first measurement indicator is located adjacent to the first measurement indicator.

13. The method of claim 1, wherein the first oral measurement image further including measurement indicators for measuring state information of at least one interdental region of the user, wherein the method further comprises steps of:

receiving state information of a target interdental region of the user measured from the tooth diagnostic device;

receiving a selection signal input for selecting a first measurement indicator from among the measurement indicators in the first oral measurement image;

matching the state information of the target interdental region with state information of the first measurement indicator; and representing the state information of the first measurement indicator in the second oral measurement image.

14. The method of claim 10, further comprising a step of:

displaying an oral result image that includes tooth result images in a tooth shape and selectively includes at least one result indicator, wherein each of the tooth result images has result state information, wherein the result state information of the first tooth result image among the tooth result images corresponds to the worst state information among the state information of the first tooth measurement image and the state information of the first measurement indicator, and wherein the at least one result indicator indicates tooth abnormality state information of the interdental region between adjacent tooth result images.

15. The method of claim 14, wherein the step of displaying of the first oral measurement image displays the first oral measurement image including the state information of the tooth result images included in the oral result image in a previous measurement period.

16. The method of claim 13, further comprising a step of:

displaying an oral result image that includes tooth result images in a tooth shape and selectively includes at least one result indicator, wherein each of the tooth result images has result state information, wherein the result state information of the first tooth result image among the tooth result images corresponds to the worst state information among the state information of the first tooth measurement image and the state information of the first measurement indicator, and wherein the at least one result indicator indicates tooth abnormality state information of the interdental region between adjacent tooth result images.

17. A terminal device, comprising:

a display unit configured to display a first oral measurement image including tooth measurement images in a tooth shape to measure state information of each of user's teeth;

a communication unit configured to receive state information of a target teeth of the user measured from a tooth diagnostic device;

a user interface unit configured to receive a selection signal input for selecting a first tooth measurement image from among the tooth measurement images; and a controller configured to control to match the state information of the target tooth with state information of the first tooth measurement image, and represent the state information of the first tooth measurement image to be represented in the first oral measurement image, wherein the state information of the target teeth is sequentially received by measuring the state information of the target tooth n times, wherein, when the state information of the target tooth is matched, worst state information among the state information of the target tooth measured n times is matched with the state information of the first tooth measurement image, wherein the first oral measurement image includes first, second, and third measurement image areas, wherein upper jaw tooth measurement images corresponding to teeth arranged on an upper jaw of the user among the tooth measurement images are represented in the first measurement image area, wherein lower jaw tooth measurement images corresponding to teeth arranged on a lower jaw of the user among the tooth measurement images are represented in the second measurement image area, wherein, in the third measurement image area, information related to the target tooth is represented, and wherein when the measurement is performed at i times out of the n times, the worst state information among the state information of the target tooth measured at the i times and the state information of the target tooth measured up to the i times is represented in the third measurement image area.

* * * * *